(12) United States Patent
Shirai et al.

(10) Patent No.: US 8,705,150 B2
(45) Date of Patent: Apr. 22, 2014

(54) IMAGE READING APPARATUS AND MEDIA CONVEYING APPARATUS

(75) Inventors: Masahiro Shirai, Tokyo (JP); Shigeru Ikezaki, Tokyo (JP); Tatsuya Nishi, Narashino (JP); Tetsurou Ishikawa, Tokyo (JP); Hiroshi Ito, Tokyo (JP)

(73) Assignee: Canon Denshi Kabushiki Kaisha, Saitama-Ken (JP)

( * ) Notice: Subject to any disclaimer, the term of this patent is extended or adjusted under 35 U.S.C. 154(b) by 214 days.

(21) Appl. No.: 13/283,990

(22) Filed: Oct. 28, 2011

(65) Prior Publication Data

US 2012/0105925 A1 May 3, 2012

(30) Foreign Application Priority Data

Nov. 2, 2010 (JP) .................................. 2010-246736
Aug. 31, 2011 (JP) .................................. 2011-189262

(51) Int. Cl.
*H04N 1/04* (2006.01)

(52) U.S. Cl.
USPC ............ 358/498; 358/497; 358/496; 358/474

(58) Field of Classification Search
USPC .................................. 358/498, 497, 496, 474
See application file for complete search history.

(56) References Cited

U.S. PATENT DOCUMENTS

| 5,285,368 | A | 2/1994 | Ishikawa |
| 5,724,154 | A | 3/1998 | Ito et al. |
| 7,151,621 | B2 | 12/2006 | Shirai et al. |
| 7,170,658 | B2 | 1/2007 | Shirai et al. |
| 7,872,783 | B2 | 1/2011 | Kitagawa et al. |
| 8,395,826 | B2 * | 3/2013 | Tan ............................. 358/474 |

FOREIGN PATENT DOCUMENTS

| JP | 9-284478 A | 10/1997 |
| JP | 2008-270954 A | 11/2008 |

* cited by examiner

*Primary Examiner* — Houshang Safaipour
(74) *Attorney, Agent, or Firm* — Fitzpatrick, Cella, Harper & Scinto

(57) ABSTRACT

An image reading apparatus according to the present invention comprises an image reading unit arranged on a conveying path of a first medium and reading an image on the first medium, a conveying unit conveying the first medium and a second medium to the image reading unit, a width of the second medium being smaller than the first medium, and guide portions guiding the second medium introduced from a discharge port along the conveying path.

20 Claims, 15 Drawing Sheets

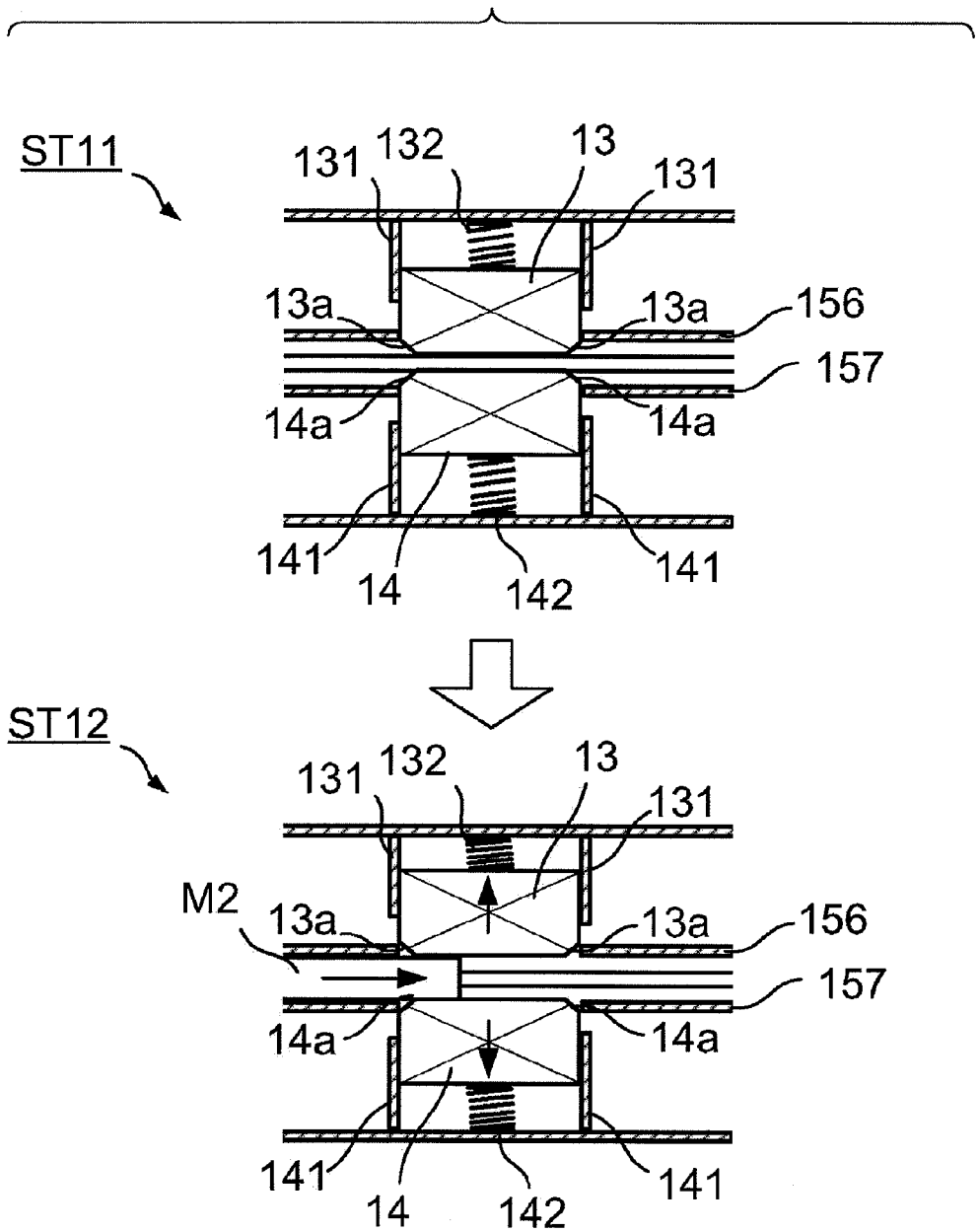

F I G. 17
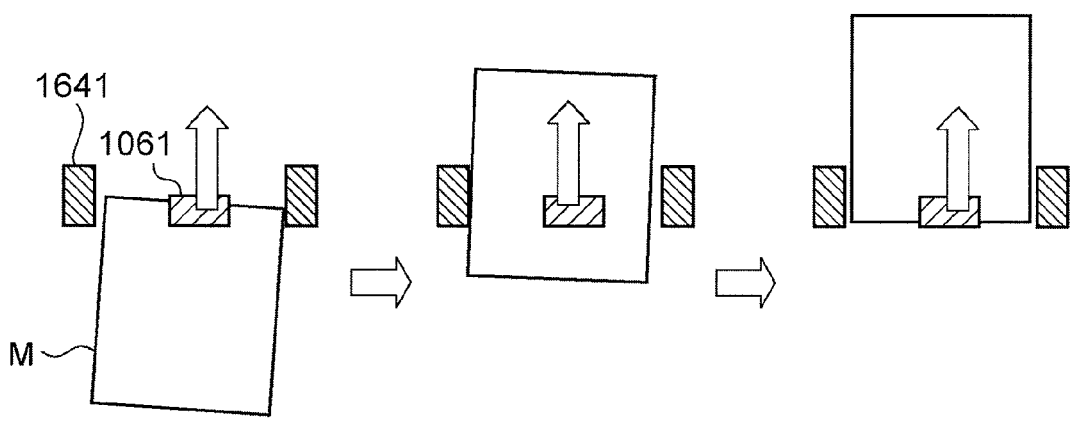

IMAGE READING APPARATUS AND MEDIA CONVEYING APPARATUS

BACKGROUND OF THE INVENTION

1. Field of the Invention

The present invention relates to an image reading apparatus for, for example, an image scanner, copying machine, or facsimile apparatus.

2. Description of the Related Art

As an image reading apparatus, for example, an ADF (Auto Document Feeder) type image reading apparatus, which can successively read stacked sheet-like media, is available. The ADF type image reading apparatus separates sheet-like media each having a predetermined size one by one, and automatically and successively feeds the separated media to execute image reading processing. Hence, the ADF type image reading apparatus can automatically convey and read media in large quantities.

On the other hand, media such as thin media, film-like media, or cards, which are different from generally used paper sheets, are often not suited to automatic feeding. Hence, the following apparatus has been proposed. That is, in this apparatus, media, which are not suited to automatic feeding, are manually fed from a discharge port side, and a conveying direction of a conveying system is switched to an opposite direction, so as to allow to introduce the cards and to read their images (for example, Japanese Patent Laid-Open Nos. 9-284478 and 2008-270954).

A size in a widthwise direction of the discharge port of the image reading apparatus is designed to be able to discharge media having a maximum size, which is planned to be used in that image reading apparatus. For this reason, for media having a small size such as cards, the width of the discharge port is often too large. As a result, when a medium having a small size is manually inserted from the discharge port, since it is skewed, a problem is posed for discharging of that medium, and an image cannot often be appropriately read.

SUMMARY OF THE INVENTION

The present invention provides a mechanism for preventing any skew of a medium having a small size such as a card when such medium is introduced from a discharge port.

According to one aspect, there is provided an image reading apparatus comprising: an introduction port used to introduce a first medium; a discharge port used to discharge the first medium; an image reading unit configured to read an image on the first medium, the image reading unit being arranged on a conveying path of the first medium, which extends from the introduction port to the discharge port; a conveying unit configured to convey the first medium from the introduction port to the discharge port, and to convey a second medium, a width of which is smaller than the first medium and which is introduced from the discharge port, to the image reading unit, so as to read an image on the second medium by the image reading unit; and guide portions configured to guide the second medium introduced from the discharge port along the conveying path, the guide portions being arranged along a conveying direction of the second medium to oppose side surface portions in a widthwise direction of the second medium.

Further features of the present invention will become apparent from the following description of exemplary embodiments (with reference to the attached drawings).

BRIEF DESCRIPTION OF THE DRAWINGS

FIG. 5 is an explanatory view of a movable mechanism of image reading units;

FIG. 17 is a conceptual view for explaining skew correction in the image reading apparatus.

DESCRIPTION OF THE EMBODIMENTS

First Embodiment

Figure 1A:
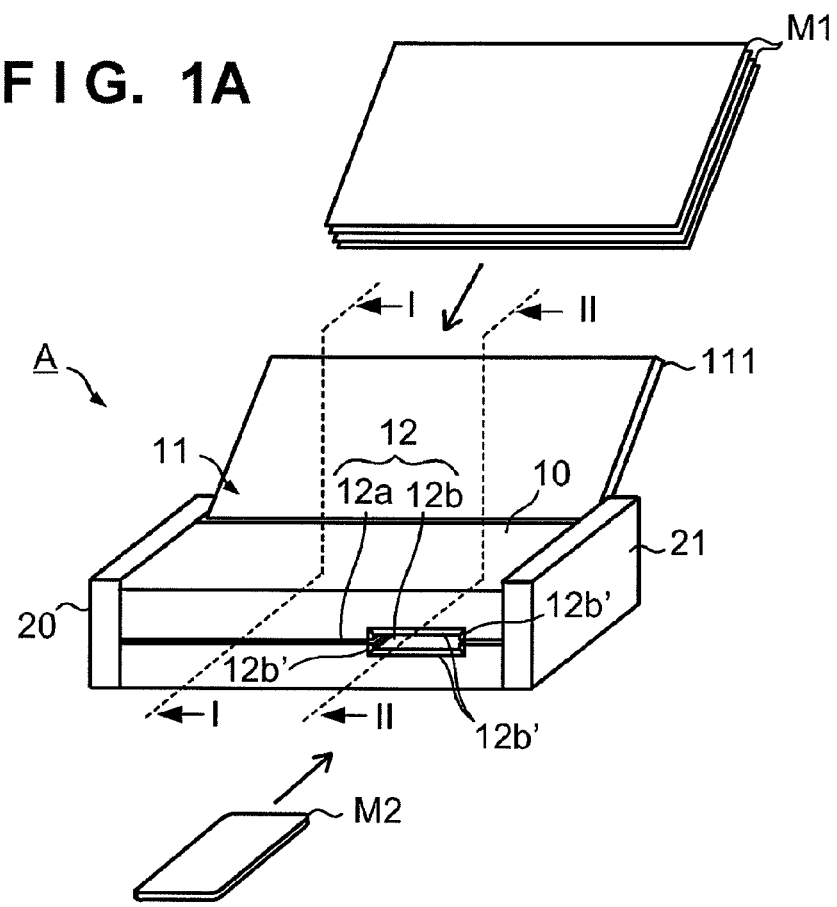
FIG. 1A is a perspective view showing the outer appearance of an image reading apparatus according to an embodiment of the present invention.
Figure 1B:
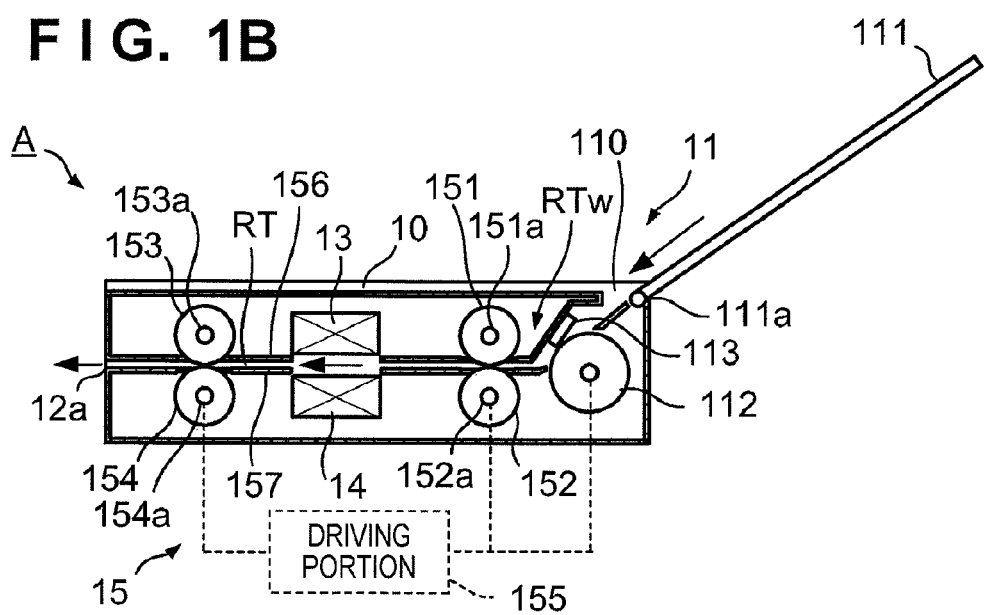
FIG. 1B is a schematic sectional view of the image reading apparatus taken along a line I-I in FIG. 1A.
Figure 2:
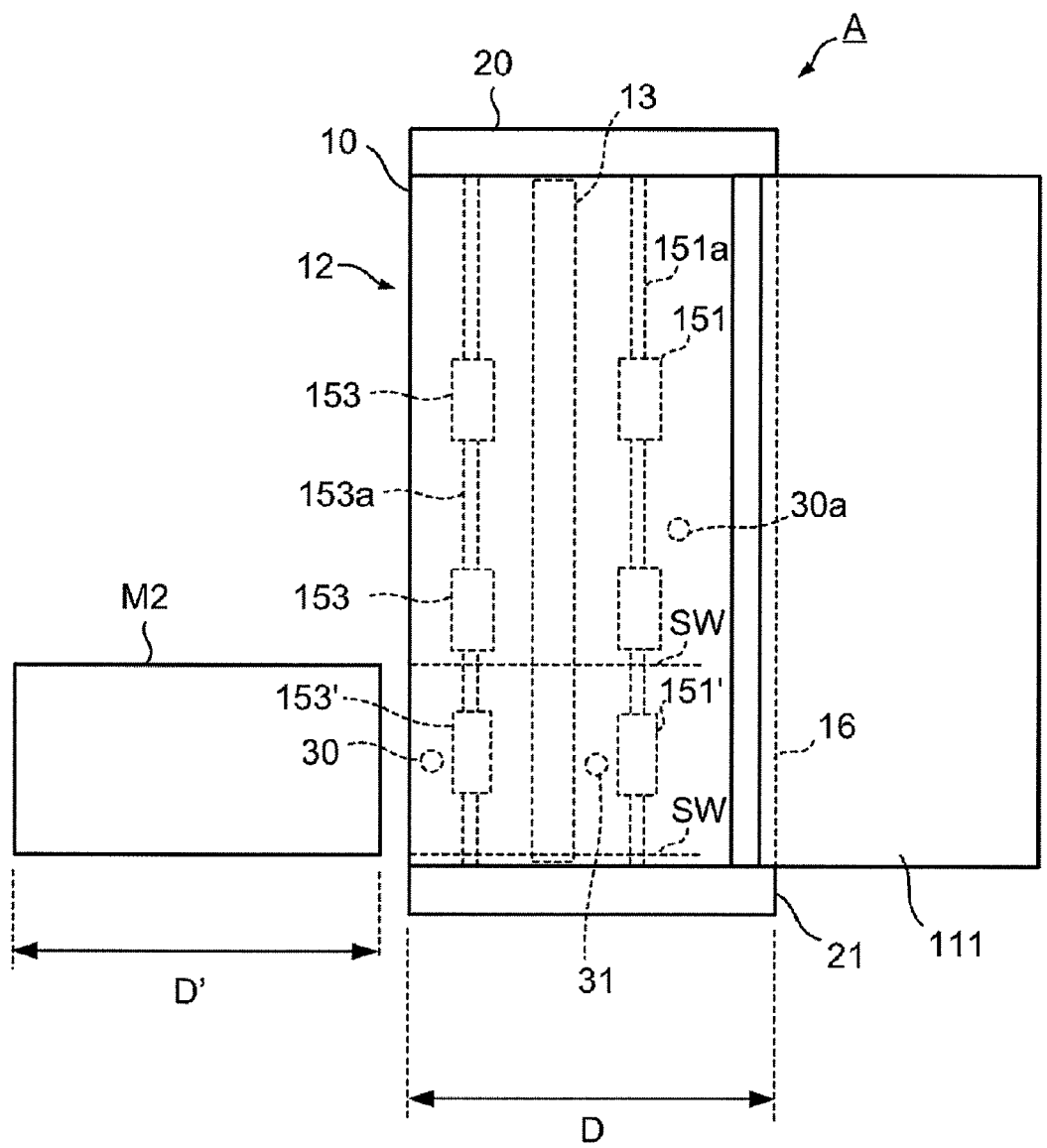
FIG. 2 is a plan view of the image reading apparatus.
Figure 3A:
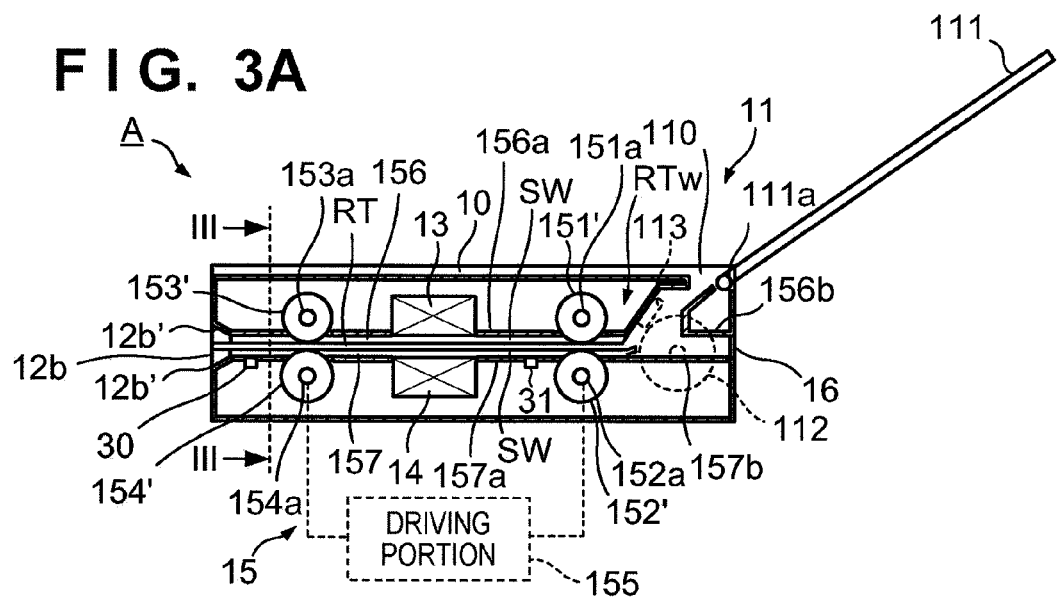
FIG. 3A is a schematic sectional view of the image reading apparatus taken along a line II-II in FIG. 1A.

FIG. 1A is a perspective view showing the outer appearance of an image reading apparatus A according to an embodiment of the present invention, FIG. 1B is a schematic sectional view of the image reading apparatus A taken along a line I-I in FIG. 1A, FIG. 2 is a plan view of the image reading apparatus A, and FIG. 3A is a schematic sectional view of the image reading apparatus A taken along a line II-II in FIG. 1A.

The image reading apparatus A includes a conveying/reading portion 10 which includes a mechanism for conveying a first medium M1 and second medium M2, and reading images on the conveyed media, and housing portions 20 and 21, which are disposed on two sides of the conveying/reading portion 10. In the housing portion 20, a driving source or portion 155 of a conveying mechanism 15 which conveys the media M1 and M2 is disposed. The driving portion 155 includes, for example, a motor, and a transmission mechanism for transmitting an output of the motor to driving shafts of rollers (to be described later) and the like. The housing portion 21 houses, for example, a control circuit and the like.

In this embodiment, the medium M1 is a sheet-like medium, and is, for example, a paper sheet. In this embodiment, the medium M2 is a medium which has a width smaller than the medium M1 and a thickness larger than the medium M1, and is, for example, a plastic card.

To one end portion of the conveying/reading portion 10, a feed tray 111 is arranged to be free to open/close. In a state in which this feed tray 111 is open, an instruction portion 11 used to introduce the medium M1 is open to the upper end portion side of the image reading apparatus A. On the other hand, a discharge port 12 used to discharge the medium M1 is formed on the other end portion of the conveying/reading portion 10. A portion of this discharge port 12 is commonly used as an introduction port (insertion port) used to, for example, manually introduce the medium M2, and a discharge port of the medium M2 after an image is read by a reading unit. Also, this discharge port 12 includes a discharge port 12a used to discharge the medium M1, and a discharge port 12b, a vertical height of which is increased compared to that of the discharge port 12a, and which is used to introduce and discharge the medium M2.

Since the vertical height of the discharge port 12b is increased compared to the discharge port 12a, a merit that allows the user to easily recognize an introduction position of the medium M2 can be provided. Also, the discharge port 12b is formed with tapers 12b, whose opening area is gradually reduced at its upper, lower, right, and left edge portions, and allows easy insertion of the medium M2 from the discharge port 12b.

To the introduction portion 11, a feed port (introduction port) 110 used to introduce the medium M1 into the conveying/reading portion 10 is arranged.

Also, in this embodiment, an automatic document feeder (ADF) is disposed. The ADF includes the feed tray 111 on which a plurality of media M1 are stacked, a feed roller 112, and a separation pad 113.

The feed tray 111 includes rotary hinge portions 111a, and is configured to be foldable on the upper surface of the conveying/reading portion 10, and is set in an open state when it is used, as shown in FIGS. 1A and 1B. The feed roller 112 is rotated by the driving portion 155, and feeds a lowermost medium M1 of those stacked on the feed tray 111.

The separation pad 113 is arranged to be in contact with an outer surface of the feed roller 112. By taking the medium M1 fed upon rotation of the feed roller 112 into a gap between this separation pad 113 and the outer surface of the feed roller 112, the medium M1 can be automatically separated and fed one by one.

The feed roller 112 and separation pad 113 are arranged only in a central portion in the widthwise direction (right-and-left direction) of the conveying/reading portion 10, and is not arranged in a region behind the discharge port 12b, as shown in FIG. 3A. This is to avoid the medium M2 from interfering with the feed roller 112 and separation pad 113 at the time of reading of the medium M2.

A conveying path (conveying space) RT where the media M1 and M2 are conveyed is formed of a wall portion 156 which forms a top wall of the path, and a wall portion 157 which forms a bottom wall of the path. The wall portions 156 and 157 are disposed over nearly the entire region of the conveying/reading portion 10.

Referring mainly to FIG. 1B, the conveying portion or mechanism 15 includes, as a conveying mechanism of the medium M1, driving shafts 152a and 154a and driven shafts 151a and 153a, which extend in the widthwise direction (right-and-left direction) of the conveying/reading portion 10. The conveying mechanism of the medium M1 includes a conveying roller pair including a driving roller 152 arranged on the driving shaft 152a and a driven roller 151 arranged on the driven shaft 151a, and a conveying roller pair including a driving roller 154 arranged on the driving shaft 154a and a driven roller 153 arranged on the driven shaft 153a.

One or a plurality of rollers are arranged as each of these rollers in the widthwise direction (right-and-left direction) of the conveying/reading portion 10, and enter the conveying path RT via openings formed in the wall portion 156 or 157. The medium M1, which is introduced by the ADF from the introduction portion 11, is conveyed by these conveying roller pairs through the conveying path RT to the discharge port 12 (12a) in a direction indicated by an arrow in FIG. 1B, and is discharged.

In the middle of the conveying path RT extending from the introduction portion 11 to the discharge port 12, image reading units 13 and 14 are disposed. The image reading units 13 and 14 read images from the media M1 and M2, which are conveyed through the conveying path RT, and extend over nearly the entire region in the widthwise direction (right-and-left direction) of the conveying/reading portion 10. For example, each of the image reading units 13 and 14 reads an image as image data by optically scanning the image, and converting the scanned image into an electrical signal, and includes a light source such as an LED, image sensor, lens array, and the like.

The image reading unit 13 is disposed on the top portion side of the conveying path RT, and the image reading unit 14 is disposed on the bottom portion side of the conveying path RT, so that the image reading unit 13 reads an upper face of the conveyed medium M1 or M2, and the image reading unit 14 reads a lower face of the conveyed medium M1 or M2. This embodiment adopts a configuration in which both the faces of the medium M1 or M2 are read. Alternatively, a configuration in which one of the image reading units 13 and 14 is disposed to read one face may be adopted. Note that an image reading timing of the medium M1 in the image reading units 13 and 14 is detected by a sensor 30a which is disposed on the upstream side of the image reading units 13 and 14. The sensor 30a is, for example, an optical sensor.

In this case, upon conveying the aforementioned medium M1 from the introduction portion 11 to the discharge port 12, the medium M1 is inflected by a bent portion RTw between the feed roller 112 and the conveying roller pair (driving and driven rollers 152 and 151), and is conveyed. For this reason, it is difficult to convey a card-like medium (especially, a thick medium, a medium having a high rigidity, or the like). Hence, the medium M2 is introduced from the discharge port 12b, is conveyed to the image reading units 13 and 14 to read images, and is discharged from the discharge port 12b again. By bending the conveying path RT of the medium M1 in this way, the apparatus height, depth, and the like in the image reading apparatus A can be reduced, thus attaining downsizing of the overall apparatus. A conveying mechanism of the medium M2 of the conveying portion 15 will be described below mainly with reference to FIG. 3A.

The conveying portion 15 includes, as a conveying mechanism of the medium M2, a conveying roller pair including a driving roller 152' arranged on the driving shaft 152a and a driven roller 151' arranged on the driven shaft 151a, and a conveying roller pair including a driving roller 154' arranged on the driving shaft 154a and a driven roller 153' arranged on the driven shaft 153a.

More specifically, the driving portion 155 which configures a conveying unit includes a first conveying mode (normal conveying mode) for conveying a medium from the introduction portion 11 toward the discharge port 12, and a second conveying mode (reverse conveying mode) for conveying a medium from the discharge port 12b toward the image reading units 13 and 14, and can control to switch the two modes. For example, in this embodiment, upon introduction of the medium M2 into the discharge port 12b, the medium M2 is conveyed in the reverse conveying mode, and after the medium M2 has passed a region facing the image reading units 13 and 14, the reverse conveying mode can be switched to the normal conveying mode (to be also referred to as "switchback conveyance" of the medium M2 hereinafter). Note that in the switchback conveyance of the medium M2, the medium M2 may be continuously conveyed or may be temporarily stopped upon switching over the conveying direction.

In this embodiment, a sensor 31 used to detect arrival and passage of the medium M2 is arranged on the introduction portion 11 side of the image reading units 13 and 14 and, more specifically, between the image reading units 13 and 14 and the conveying roller pair (driving and driven rollers 152 and 151).

The sensor 31 is used to detect a reverse conveying timing (switchback conveyance timing) so as to discharge the medium M2 read by the image reading unit 13 or 14 from the discharge port 12b at the time of conveyance of the medium M2. Note that images on both the faces of the medium M2 may be read in one of a forward and backward paths, or images may be separately read face by face in both the forward and backward paths.

In this embodiment, as the rollers 151' to 154', those having a smaller diameter than that of the rollers 151 to 154 are used. This is to consider the fact that the medium M2 is thicker than the medium M1. However, as both of these rollers, those having the same diameter may be used.

Note that at least surface layers of the rollers 151' to 154' are preferably formed of a material (cushioning material such as low-hardness rubber, elastomer, or sponge) softer than the rollers 151 to 154. This is to assure an appropriate conveying force while appropriately absorbing thickness variations caused by, for example, types of media M2.

Taking a credit card as an example of the medium M2, when text regions have embossed portions, these embossed portions are absorbed by elastic deformations of the rollers 151' to 154', thereby preventing the medium M2 from being skewed due to the embossed portions which locally serve as resistive regions at the time of conveyance. In such case, the rollers 151' to 154' having the same diameter as the rollers 151 to 154 may be used.

In this embodiment, the conveying mechanism of the medium M1 and that of the medium M2 commonly use the driving shafts 152a and 154a and driven shafts 151a and 153a, thus also commonly using the driving portion 155. However, a conveying portion of the medium M1 and that of the medium M2 may be independently configured.

When the user manually introduces the medium M2, if the introduction direction is improper, the medium M2 may be conveyed while being skewed. In order to prevent such skew, the following arrangement is equipped.

In this embodiment, in a region behind the discharge port 12b, the wall portions 156 and 157 respectively have concave portions 156a and 157a, as shown in FIG. 3A. The concave portions 156a and 157a have a right-and-left width (which is slightly wider than that of the medium M2) corresponding to that of the medium M2, and extend in a depth direction (conveying direction of the medium M2).

Figure 3B:
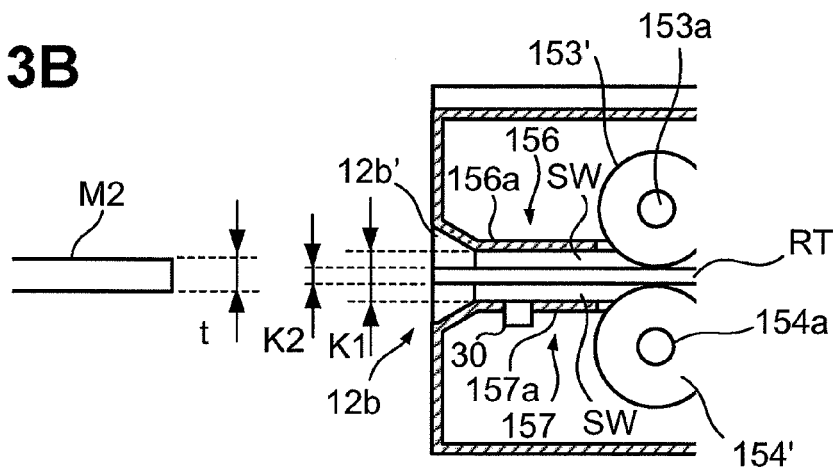
FIG. 3B is an explanatory view of a size relationship between a medium and discharge port.

The concave portion 156a is concave upward, and the concave portion 157a is concave downward. A concave depth is set according to the thickness of the medium M2. FIG. 3B shows a relationship among a thickness t of the medium M2, a height K1 in an up-and-down direction of a portion formed with the concave portions 156a and 157a of the conveying path RT, and a height K2 in the up-and-down direction of a portion excluding the concave portions 156a and 157a of the conveying path RT. Note that the discharge port 12a also has the height K2.

Then, the relationship of these thickness and heights meets K2<t<K1. With this relationship, when the user inserts the medium M2 into the discharge port 12, it is difficult to insert it into a portion other than the discharge port 12b, thus urging the user to insert the medium M2 at a proper position.

Figure 3C:
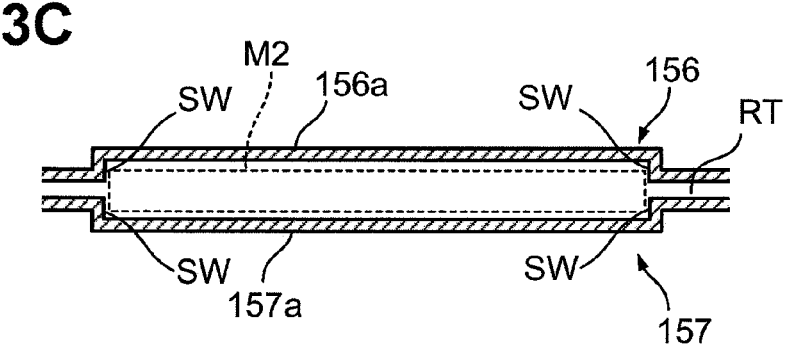
FIG. 3C is a schematic sectional view of upper and lower wall portions taken along a line III-III in FIG. 3A.

Then, inner side surfaces of the concave portions 156a and 157a form regulation wall portions SW, which are disposed along the conveying direction of the medium M2 to face side surface portions of the medium M2 in the widthwise direction, and guide the medium M2 which is introduced from the discharge port 12b into the conveying path RT, as shown in FIG. 3C. The regulation wall portions SW serve as guide portions which prevent any skew of the medium M2. The regulation wall portions SW do not pose any problem for conveyance of the medium M1 since they exist above or below a passing position of the medium M1 in the relationship with the medium M1. In this embodiment, end portions of the concave portions 156a and 157a extend up to the discharge port 12, thus configuring the discharge port 12b.

Note that in this embodiment, the concave portions 156a and 157a are respectively formed in the wall portions 156 and 157. Alternatively, a concave portion may be formed in one of the wall portions to form the regulation wall portion SW only on the upper or lower side.

The operations of the image reading apparatus A upon reading of images on the medium M2 will be described below with reference to FIG. 4. In this embodiment, an opening 16 is formed in a rear portion of the conveying/reading portion 10, so that the medium M2 is linearly conveyed and is temporarily projected from the opening 16 at the time of reading of images on the medium M2. This contributes to downsizing of the image forming apparatus A.

More specifically, as shown in FIG. 2, for example, in this embodiment, a length D in the depth direction of the image reading apparatus A is substantially equal to a length D' in the lengthwise direction of the medium M2. Also, the conveying path RT of the medium M2 includes a straight path, which is formed to extend from the discharge port 12b through a portion of the conveying path of the medium M2 a slit (which is a conveying path dedicated to the medium M2, and is a saving area for switchback conveyance in this embodiment) open to the bent portion RTw. For example, this slit is open, as the opening 16, to the rear portion (rear surface) of the image reading apparatus A in this embodiment.

For this reason, in a state in which after the medium M2 is introduced from the discharge port 12b, the leading end of the medium M2 reaches the rear end portion of the image reading apparatus A, the entire medium M2 is temporarily housed inside the image reading apparatus A. After that, when the trailing end portion of the medium M2 has passed the sensor 31, the medium M2 goes into the slit, and the driving portion 155 is switched to perform switchback conveyance.

At this time, the leading end portion side of the medium M2 temporarily projects from the opening 16. At this time as well, since the rear portion side of the medium M2 is guided by the regulation wall portions SW, its movement in the widthwise direction is substantially regulated. Thus, even in the switchback conveyance, any skew of the medium M2 can be effectively prevented.

As described above, in this embodiment, as the regulation wall portions used to prevent any skew of the medium M2, the wall portions (conveyance guides of the medium M2) are arranged on at least portions corresponding to the discharge port 12b side and its opposite side (opening 16 side) of the image reading units 13 and 14 in the conveying path RT of the medium M2. Thus, the image reading apparatus A of this embodiment can attain switchback conveyance of the medium M2 by commonly using a portion of the conveying path, and can effectively prevent any skew of the medium M2, while allowing to convey the medium M1, thus improving image reading quality.

Figure 4:
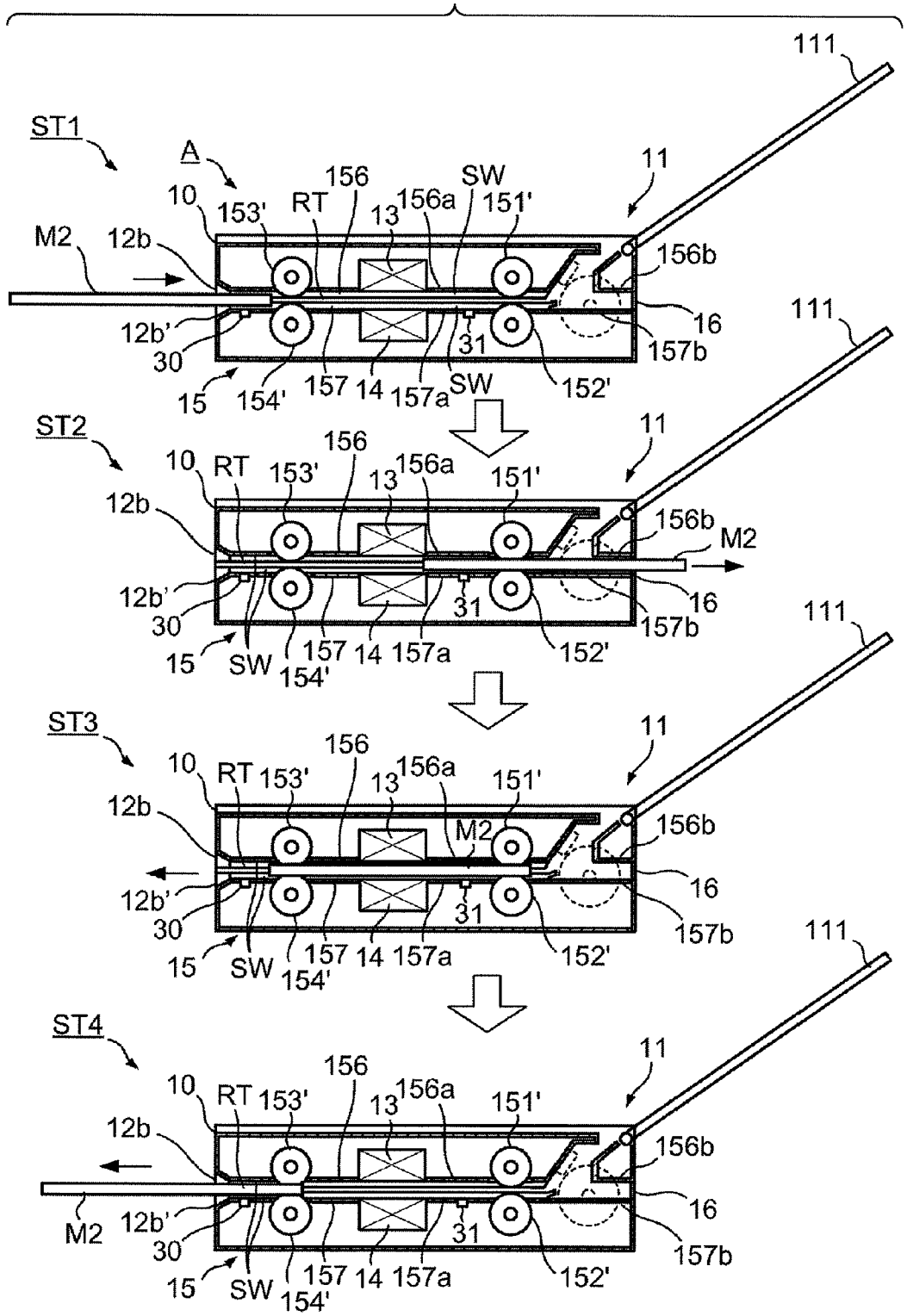
FIG. 4 is an explanatory view of the operations of the image reading apparatus.

In FIG. 4, reference numeral ST1 denotes a state in which the user introduces the medium M2 into the discharge port 12b. The user can easily introduce the medium M2 into the discharge port 12b to have a correct posture using guidance of the regulation wall portions SW. Introduction of the medium M2 is detected by the sensor 30. The sensor 30 is, for example, a reflection type optical sensor. When the sensor 30 detects introduction of the medium M2 (arrival of the leading end portion side of the medium M2 in practice), the driving rollers 154' and 152' are rotated to convey the medium M2 in a direction of an arrow, so that the medium M2 introduced into the discharge port 12b is conveyed to the image reading units 13 and 14. At the time of conveyance, a movement in a surface direction of the medium M2 is regulated due to the presence of the regulation wall portions SW, thus effectively preventing any skew of the medium M2.

When the medium M2 passes through the image reading units 13 and 14, the image reading units 13 and 14 read images on the obverse and reverse faces of the medium M2. Reference numeral ST2 denotes a state in which the reading operations is complete. A portion of the medium M2 projects from the opening 16.

Upon completion of the reading operations, the driving rollers 154' and 152' are rotated in a reverse direction to convey the medium M2 in the reverse direction. Whether or not the reading operations are complete can be judged using, for example, the reading results of the image reading units 13 and 14. Reference numeral ST3 denotes a state in which the medium M2 is conveyed in the reverse direction. Note that the image reading operations may be made in the middle of this conveyance in the reverse direction.

Reference numeral ST4 denotes a state in which the medium M2 is being discharged from the discharge port 12b. When the medium M2 is discharged from the discharge port 12b, processes as one unit end.

In this manner, according to this embodiment, the regulation wall portions SW can prevent any skew of the medium M2, and can be prevented from interfering with the medium M1 at the time of conveyance of the medium M1.

Second Embodiment

When the image reading units 13 and 14 are fixed, an interval between their reading surfaces is that which allows the medium M2 thicker than the medium M1 to pass through it. For this reason, the reading surfaces of the image reading units 13 and 14 are often separated away from the obverse and reverse faces of the medium M1, and a sharper image is often difficult to obtain. Hence, a movable mechanism which allows the image reading units 13 and 14 to be movable so as to decrease and increase the interval between the reading surfaces of the image reading units 13 and 14 may be arranged. FIG. 5 shows an example of such movable mechanism.

Referring to FIG. 5, the image reading unit 13 is arranged to be vertically displaceable by guide plates 131, and is supported by an elastic member 132 such as a coil spring in a suspended state. The image reading unit 14 is arranged to be vertically displaceable by guide plates 141, and is biased upward by an elastic member 142 such as a coil spring. Thus, the image reading unit 13 is movable in a direction to be separated away from the conveying path according to the thickness of the medium M2.

Note that it is desirable to respectively set the suspended position of the image reading unit 13 by the elastic member 132 and the biased position of the image reading unit 14 by the elastic member 142 at the two-end portion side in the lengthwise direction of the image reading units. This is because the unit reading surfaces can be efficiently brought into contact with the medium M2 at the time of conveyance of the medium M2 at the one-end portion side of the image reading units. Also, slopes 13a and 14a are respectively formed on the two end portions of the image reading units 13 and 14 in the conveying direction of the medium M1 or M2.

Normally, a state ST11 is set. In this state, the image reading unit 13 is located at its lowermost position, and the image reading unit 14 is located at its uppermost position, and the interval between the reading surfaces of the image reading units 13 and 14 is a narrow interval within a range that allows the medium M1 to pass through it. Note that stoppers which restrict the lowermost position of the image reading unit 13 and the uppermost position of the image reading unit 14 may be arranged.

At the time of passage of the medium M2, the slopes 13a and 14a contact the medium M2, so that the image reading unit 13 moves upward, and the image reading unit 14 moves downward, thus increasing the interval between the reading surfaces in correspondence with the thickness of the medium M2. Upon completion of passage of the medium M2, the image reading units 13 and 14 return to the state ST11 again by the elastic members 132 and 142.

In this manner, according to this embodiment, since the interval between the reading surfaces of the image reading units 13 and 14 changes in correspondence with the media M1 and M2, more suitable image reading operations can be attained. Note that in this embodiment, the image reading units 13 and 14 are respectively configured to be vertically movable. Alternatively, only one image reading unit may be configured to be vertically movable.

Third Embodiment

Figure 6A:
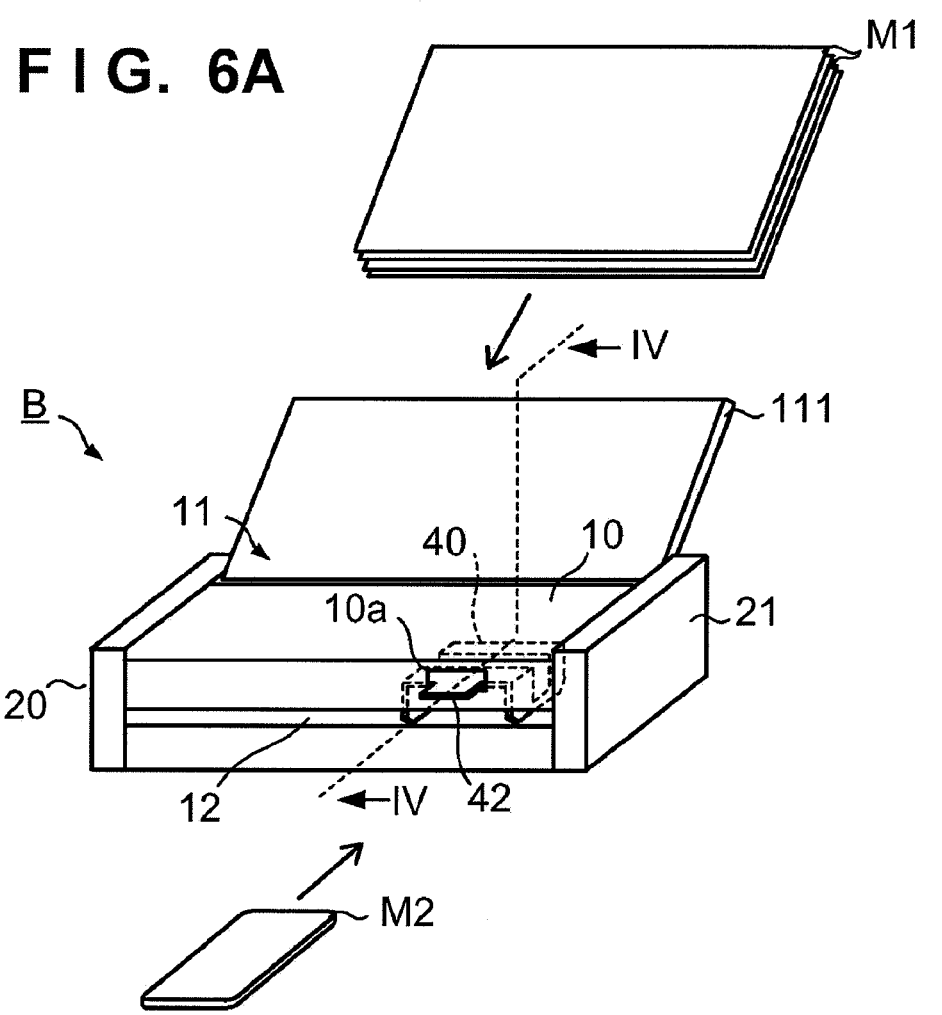
FIG. 6A is a perspective view showing the outer appearance of an image reading apparatus according to another embodiment of the present invention.
Figure 6B:
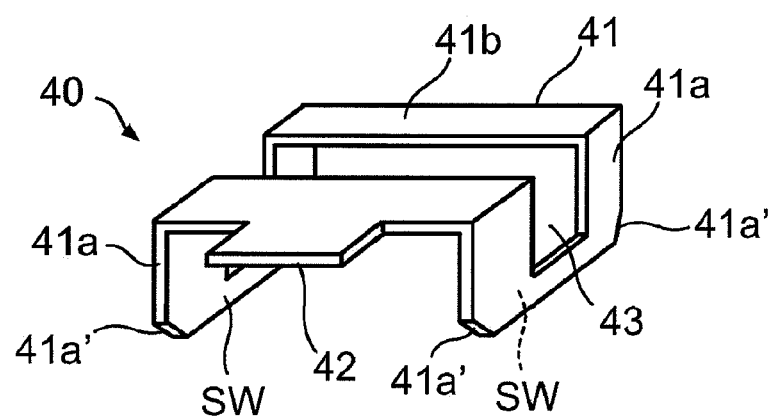
FIG. 6B is a perspective view showing the outer appearance of a regulation member.
Figure 7A:
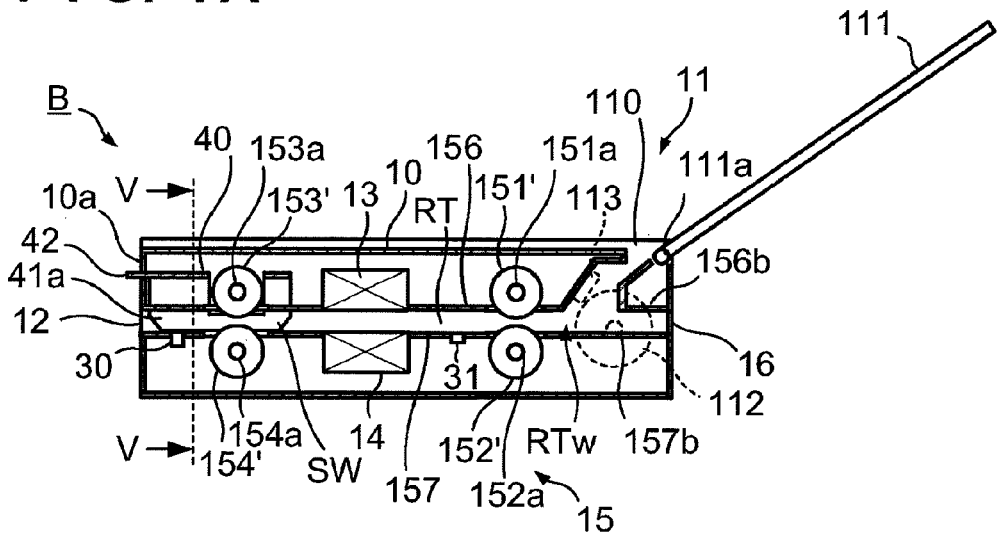
FIGS. 7A and 7B are explanatory views of the operations of the regulation member.
Figure 7B:
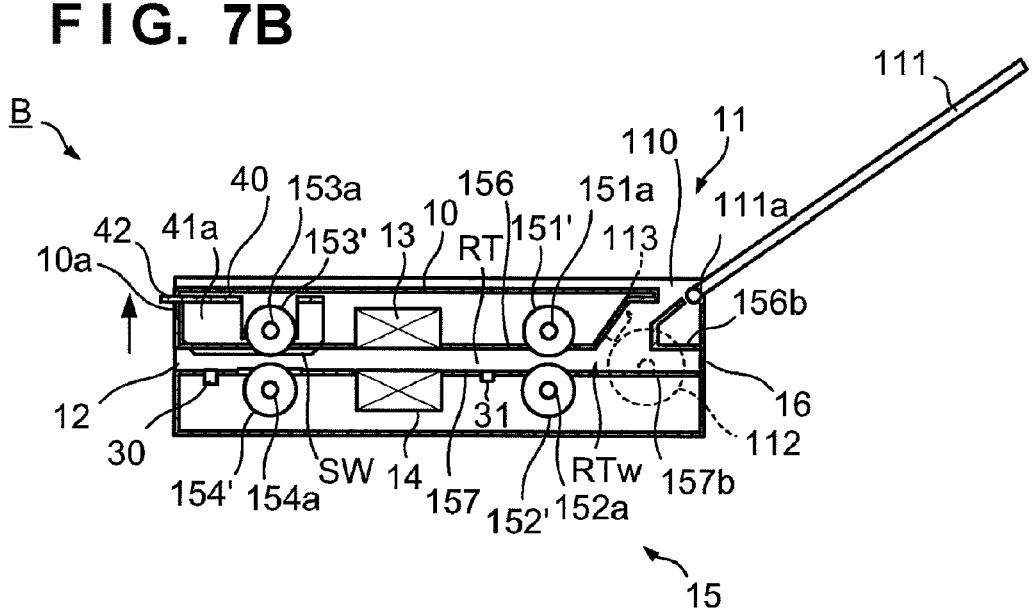

In the first embodiment, the regulation wall portions SW are formed using the wall portions 156 and 157, but they may be formed using another guide member. FIG. 6A is a perspective view showing the outer appearance of an image reading apparatus B according to another embodiment of the present invention, and FIG. 6B is a perspective view showing the outer appearance of a regulation member 40. FIGS. 7A and 7B are explanatory views of the operations of the regulation member 40, and are schematic sectional views of the image reading apparatus B taken along a line IV-IV in FIG. 6A. In these figures, the same reference numerals denote components of the image reading apparatus B, which correspond to those of the image reading apparatus A, a description thereof will not be repeated, and different components will be explained.

In this embodiment, a height in an up-and-down direction of the discharge port 12 and conveying path RT is decided with reference to the thickness of the medium M2, and the same height is set over the entire region.

The regulation member 40 includes a roughly U-shaped main body portion 41 having a top portion 41b and a pair of side portions 41a, and a tab portion 42 which extends forward from the top portion 41b, and serves as a guide member. The main body portion 41 is formed with a notch 43 used to prevent any interference between the driven roller 153' and driven shaft 153a, and the regulation member 40. Also, slopes 41a' are formed on front and rear portions of the lower ends of the side portions 41a.

The regulation member 40 is arranged inside the conveying/reading portion 10 except for its tab portion 42, and is vertically displaceable. The tap portion 42 externally projects from an opening 10a formed in the front surface of the conveying/reading portion 10, and is operable by the user. A height in the up-and-down direction of the opening 10a is set to allow a vertical displacement of the regulation member 40.

Figure 8A:
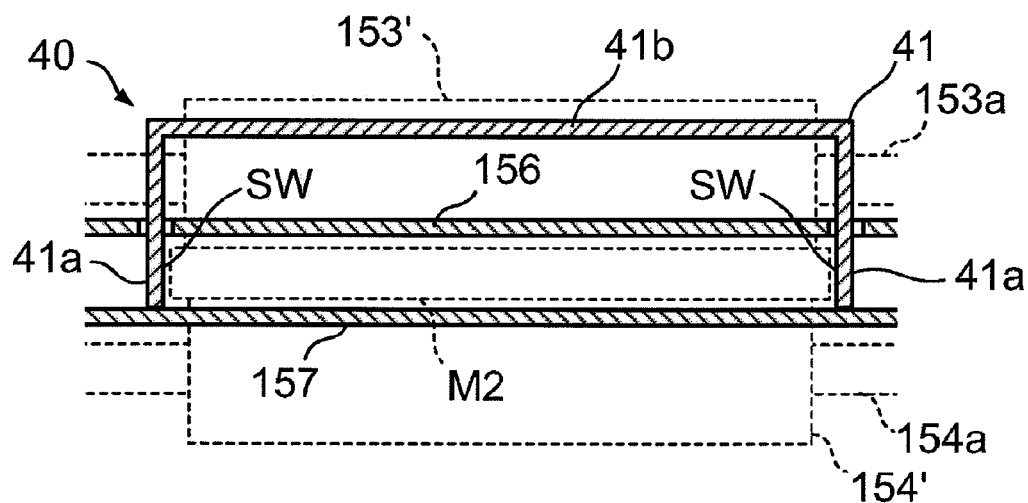
FIG. 8A is a schematic sectional view around the regulation member taken along a line V-V in FIG. 7A.

FIG. 7A shows a state in which the regulation member 40 is located at a lower guide position. FIG. 8A is a schematic sectional view around the regulation member 40 taken along a line V-V in FIG. 7A. The regulation member 40 is in a state in which its slide portions 41a pass through slits formed in the wall portion 156 and land on the wall portion 157. Inner side surfaces of the slide portions 41a form the regulation wall portions SW. At this guide position, the regulation wall portions SW guide the medium M2 which is introduced from the discharge port 12 into the conveying path RT, and prevent its skew.

Figure 8B:
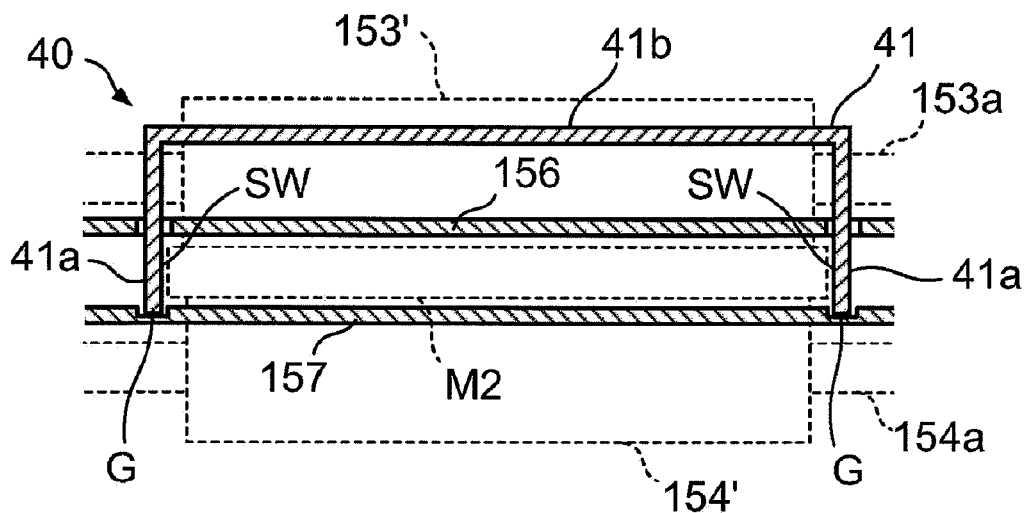
FIG. 8B is a schematic sectional view showing an example of grooves formed in wall portions.

Note that grooves G are formed in the wall portion 157, and the lower ends of the side portions 41a can enter the grooves G, as shown in FIG. 8B. Thus, a situation in which gaps are formed between the lower ends of the side portions 41a and the wall portion 157, and the regulation wall portions SW do not guide the medium M2 can be prevented more reliably.

In this embodiment, the regulation wall portions SW are arranged in a region between the discharge port 12 and conveying roller pair (rollers 153' and 154'), and prevent any skew of the medium M2 within this range. Therefore, a guide length of the medium M2 is smaller than the first embodiment. However, a skew of the medium M2 is usually caused by an improper direction of the medium M2 when the user introduces the medium M2. Hence, even when the regulation wall portions SW are arranged within the range of this embodiment, they have a given effect to prevent any skew of the medium M2.

FIG. 7B shows a state in which the regulation member 40 is located at an upper retracted position. The side portions 41a of the regulation member 40 roughly exit from the conveying path RT, and do not disturb conveyance of the medium M1 which passes through the conveying path RT.

The user moves the regulation member 40 vertically while pinching the tab portion 42 to displace the regulation member 40 to the retracted position in FIG. 7B when the medium M1 is automatically fed by the ADF, and to the guide position in FIG. 7A when the medium M2 is manually introduced from the discharge port 12. Note that even when the user forgets to displace the regulation member 40 to the retracted position at the time of reading of the medium M1, in case of this embodiment, the medium M1 contacts the slopes 41a' to push up the regulation member 40, thus preventing the medium M1 from being jammed.

As described above, according to this embodiment, the regulation wall portions SW can prevent any skew of the medium M2, and can be prevented from interfering with the medium M1 at the time of conveyance of the medium M1.

Note that an elastic member such as a coil spring, which always biases the regulation member 40, may be arranged to normally locate the regulation member 40 at the retracted position. Also, in this embodiment, the regulation member 40 is manually vertically moved. Alternatively, an electric actuator which automatically moves the regulation member vertically may be arranged.

Fourth Embodiment

The third embodiment and the second embodiment can be combined with each other. In terms of changing the interval between the reading surfaces of the image reading units 13 and 14 in correspondence with the media M1 and M2, as described in the second embodiment, an interlocking mechanism which displaces at least one of the image reading units 13 and 14 to be interlocked with the displacement of the regulation member 40 may be arranged.

Figure 9A:
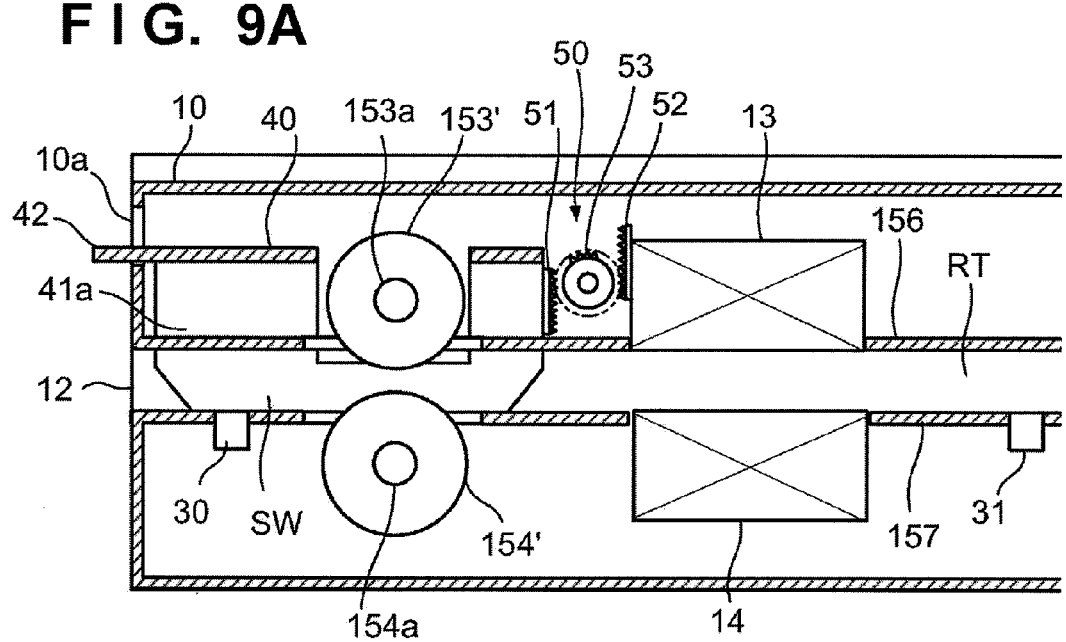
FIGS. 9A and 9B are explanatory views of an interlocking mechanism of the regulation member and image reading units.
Figure 9B:
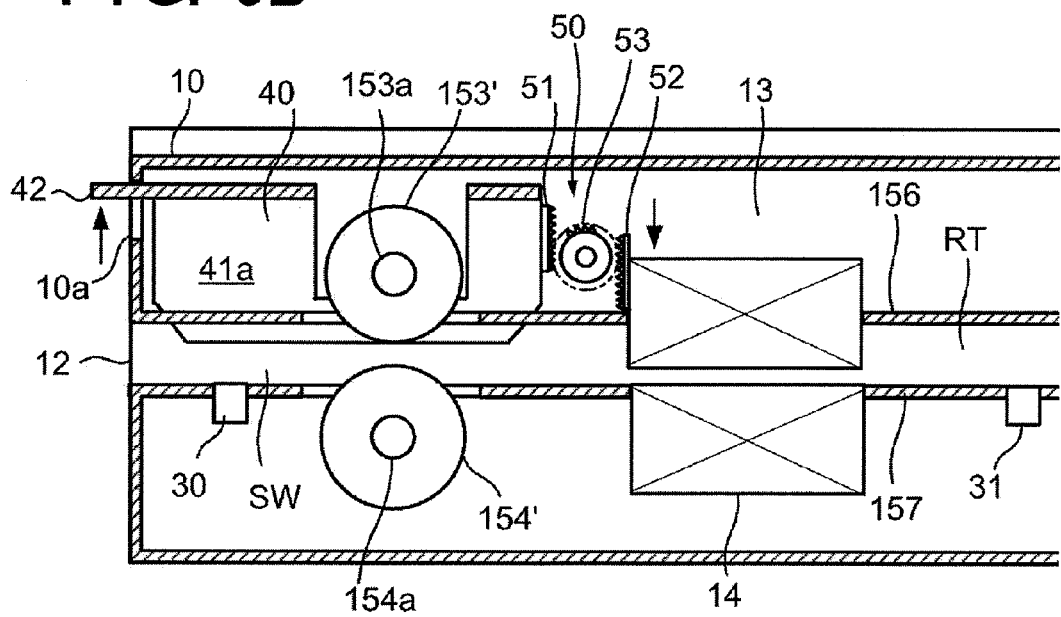

FIGS. 9A and 9B are explanatory views of an interlocking mechanism 50 between the regulation member 40 and the image reading unit 13. The interlocking mechanism 50 includes a rack 51 arranged on the regulation member 40, a rack 52 arranged on the image reading unit 13, and a pinion 53 which is rotatably supported between the racks 51 and 52 and meshed with them. Note that the image reading unit 13 can be arranged to be vertically displaceable by, for example, the guide plates 131 shown in FIG. 5.

With this interlocking mechanism 50, when the regulation member 40 moves upward, the image reading unit 13 moves downward. When the regulation member 40 moves downward, the image reading unit 13 moves upward.

Then, a positional relationship between the regulation member 40 and the image reading units 13 and 14 is set as follows. That is, when the regulation member 40 is located at the retracted position, the image reading unit 13 is located at a medium M1 reading position in the vicinity of the image reading unit 14, and when the regulation member 40 is located at the guide position, the image reading unit 13 is located at a medium M2 reading position separated from the image reading unit 14. In this manner, the interval between the reading surfaces of the image reading units 13 and 14 can be changed in correspondence with the media M1 and M2.

Fifth Embodiment

Figure 10A:
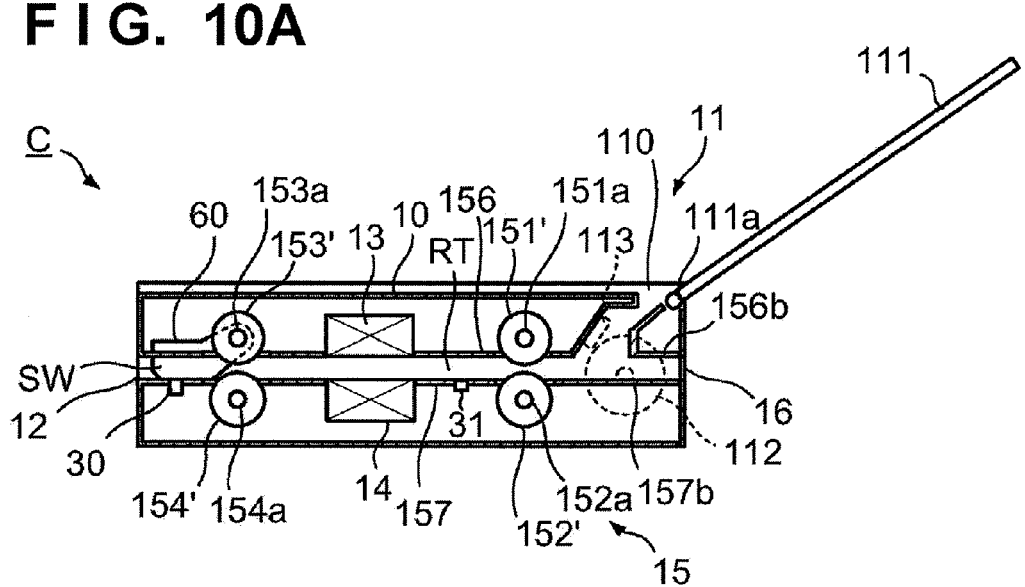
FIGS. 10A and 10B are explanatory views showing another example of a regulation member.
Figure 10B:
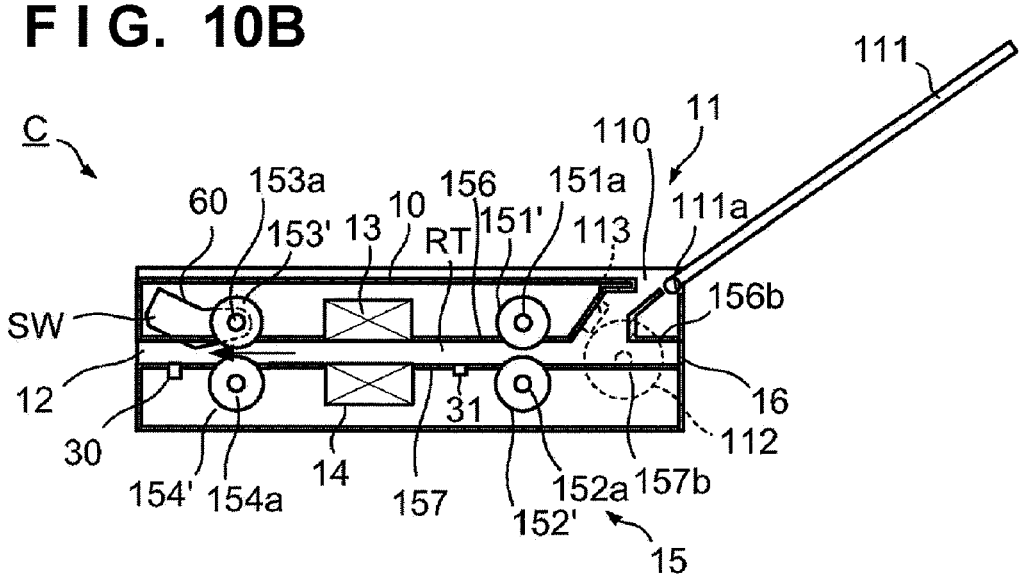
Figure 11:
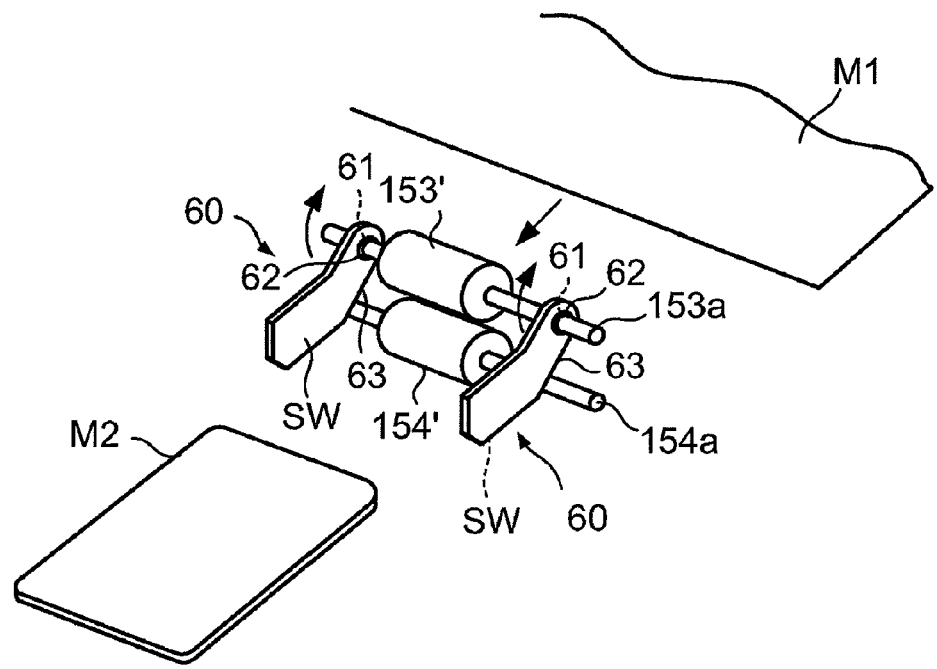
FIG. 11 is an explanatory view of the regulation member of the other example.

In the third embodiment, the regulation member 40 is displaceable between the guide position and retracted position by its vertical translation. Alternatively, the relation member may be displaceable by means of swinging. FIGS. 10A and 10B are explanatory views of a regulation member 60, and are schematic sectional views of an image reading apparatus C using the regulation member 60. FIG. 11 is an explanatory view of the regulation member 60, and shows an overview of a swinging mechanism. Different components from the example of the third embodiment will be described below.

Referring mainly to FIG. 11, the regulation member 60 is arranged swingably about an axis parallel to a direction perpendicular to the conveying direction of the medium M1. More specifically, in this embodiment, a pair of regulation members 60 are used, and each regulation member 60 has a plate-like shape which includes a shaft hole 61 in which the driven shaft 153a is rotatably inserted, and which extends from the shaft hole 61 toward the discharge port 12 side. Also, each regulation member 60 is formed with a slope 63 at a position corresponding to a rear end portion in the conveying direction of the medium M1.

On two sides of the shaft hole 61, stoppers 62, which restrict movements of the regulation member 60 in the axial direction of the driven shaft 153a, are attached to the driven shaft 153a. The pair of regulation members 60 are attached to the driven shaft 153a to be spaced apart by a distance according to the width in the right-and-left direction of the medium M2, and their inner side surfaces configure the regulation wall portions SW.

Note that this embodiment uses the pair of regulation members 60. Alternatively, these regulation members may be integrated into a single member. Also, the driven shaft 153a is commonly used as a swinging central shaft. Alternatively, a dedicated swinging central shaft may be arranged in addition to the driven shaft 153a.

The operation of the regulation members 60 will be described below with reference to FIGS. 10A and 10B. Unlike in the third embodiment, the regulation members 60 are entirely arranged inside the conveying/reading portion 10 since they are not manually operated by the user.

In a normal state, the regulation members 60 are located at a guide position shown in FIG. 10A as a result of a swing motion due to their self weights. In this state, the regulation members 60 pass through slits formed in the wall portion 156, and land on the wall portion 157. This state is just the same as that of the side portions 41 of the regulation member 40 shown in FIG. 8A. The regulation wall portions SW configured by the inner side surfaces of the regulation members 60 guide the medium M2, which is introduced from the discharge port 12 into the conveying path RT, and prevent its skew.

When the medium M1 is conveyed, and is discharged from the discharge port 12, the leading end portion of the medium M1 contacts the slopes 63 to cause a swing motion of the regulation members 60, and the regulation members 60 automatically move to a retracted position shown in FIG. 10B. That is, when a clockwise swinging force in FIG. 10B generated by a conveying force of the medium M1 exceeds a counterclockwise swinging force in FIG. 10B generated by the self weights of the regulation members 60, the regulation members 60 automatically move to the retracted position. Respective arrows shown in FIG. 11 indicate the conveying direction of the medium M1 and swinging direction of the regulation members 60.

As described above, according to this embodiment, the regulation wall portions SW can prevent any skew of the medium M2 and can be prevented from interfering with the medium M1 at the time of conveyance of the medium M1. Note that it is preferable to combine this embodiment with the second embodiment and the arrangement example (grooves G) shown in FIG. 8B.

Sixth Embodiment

The first to fifth embodiments of the present invention have been described. However, the present invention is not limited to the aforementioned first to fifth embodiments, and respective embodiments may be combined with each other.

Furthermore, the aforementioned first embodiment and the like have explained the case in which the medium M2 is conveyed by the switchback conveyance. Of course, the present invention is not limited to this. For example, the medium M2 may be introduced from the discharge port of the medium M1, and may be discharged to the apparatus rear surface side (opening 16).

In the aforementioned first embodiment and the like, the medium M2 temporarily projects to the apparatus rear surface side when it is conveyed by the switchback conveyance. Of course, the present invention is not limited to this. For example, a sufficient region may be assured between the end portions of the image reading units and the apparatus rear surface, so as not to project the medium M2 from the apparatus rear surface.

Moreover, when the medium M2 has a rectangular shape (for example, a credit card), in place of inserting the medium M2 from one end portion in its lengthwise direction in the first embodiment and the like, for example, the medium M2 may be inserted from one end portion in its widthwise direction, that is, from its long side, and may be conveyed to execute image reading operations.

In this case, the medium M2 can be prevented from projecting from the apparatus rear surface, and the switchback conveyance can be realized without increasing the size of the apparatus. Also, the switchback conveyance can be prevented from being disturbed when the medium M2 collides against an obstacle on the apparatus rear surface side. In addition, since the need for forming the projection opening of the medium M2 on the apparatus rear surface can be obviated, the rigidity, durability, and the like of the apparatus can also be improved (for example, entrance of dust or the like into the apparatus can be prevented).

Seventh Embodiment

An image reading apparatus according to the seventh embodiment of the present invention will be described below.

<Apparatus Arrangement>

The arrangement of an image reading apparatus 1010 of this embodiment will be described first with reference to FIG. 12.

Figure 12:
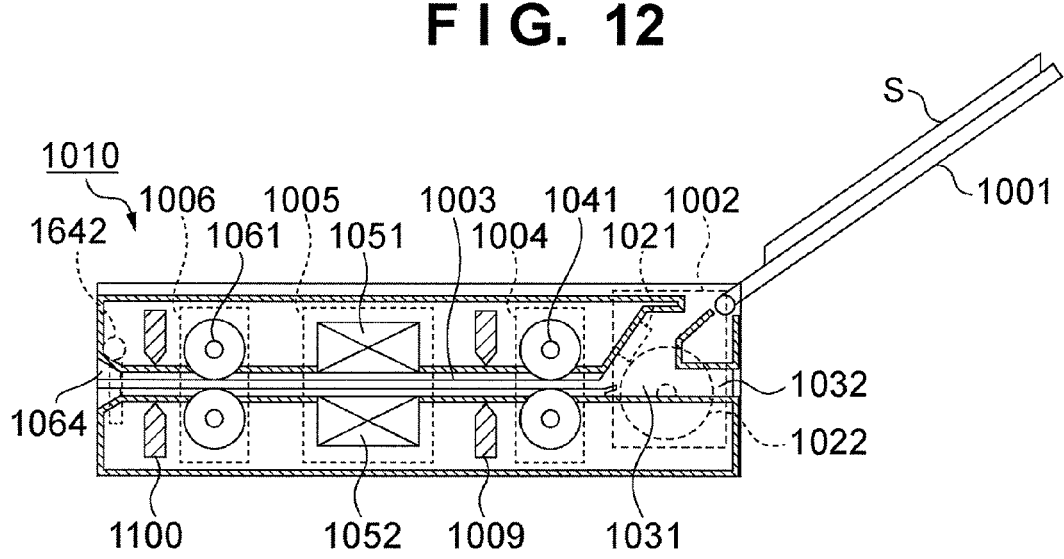
FIG. 12 is a side sectional view illustrating an image reading apparatus according to still another embodiment of the present invention.

Referring to FIG. 12, sheet-like media (to be referred to as sheet media hereinafter) S such as paper sheets or films to be read are placed on a tray 1001. A feed portion (introduction port) 1002 as a first medium feed portion separates a plurality of sheet media S one by one using a separation portion 1021, and each sheet medium is conveyed by a feed roller 1022 to a conveying portion 1004. A bent portion 1031 is formed on a conveying path 1003 along which the sheet medium S is conveyed. Such bent portion 1031 is formed to attain downsizing of the image reading apparatus 1010. That is, in order to form the conveying path 1003 without any bent portion 1031, a size of the apparatus has to be increased. Note that a sheet medium having a relatively low rigidity is conveyed while it deforms along the bent portion 1031.

Also, on the conveying path 1003, a saving portion 1032, which is a portion of the conveying path 1003 that extends from a discharge portion (discharge port) 1006 as a second medium feed portion beyond the conveying portion 1004 and can receive the leading end portion of a sheet, is arranged. Note that an end portion of this saving portion 1032 may be open to the rear surface of the apparatus main body like in this embodiment or the saving portion 1032 may be arranged only inside the apparatus main body without being open to the outside of the apparatus.

The conveying portion 1004 includes a first conveying roller pair 1041. Also, the discharge portion 1006 includes a second conveying roller pair 1061 and guide unit 1064, and discharges the sheet medium S conveyed from the conveying portion 1004 to outside the apparatus. The guide unit 1064 includes right and left rib portions 1641, which are disposed to be perpendicular to a conveying direction and to be separated by about 5 mm from a card width, so as to close the conveying path 1003. The guide unit 1064 includes its rotary fulcrum portions on an upper portion of the conveying path 1003, and is fixed to be swingable in the conveying direction.

The image reading apparatus 1010 includes a driving portion (not shown) which rotates the first and second conveying roller pairs 1041 and 1061 in normal and reverse directions.

An image reading portion 1005 includes a first image reading unit 1051 and second image reading unit 1052 which have area image sensors such as a CCD or C-MOS, and are disposed at upper and lower positions to sandwich the conveying path 1003 between them. The first and second image reading units 1051 and 1052 are arranged between the first conveying roller pair 1041 and the second conveying roller pair 1061 on the conveying path 1003, and can read an image on a first face of a passing document and an image on a second face as a reverse face of the first face. A detection sensor 1009 is arranged between the image reading portion 1005 and first conveying roller pair 1041, and detects the presence/absence of a passing sheet medium.

A discharge sensor 1100 is arranged in the vicinity of the discharge portion 1006, and detects the presence/absence of a passing sheet medium. In this case, the sensor 1100 is described as a discharge sensor, but it also serves as an insertion detection sensor for a sheet medium such as a card, as will be described in detail later. Note that the image reading apparatus 1010 of this embodiment can feed documents respectively from the feed portion 1002 and discharge portion 1006. When a document is fed from the discharge portion 1006, the user inserts a sheet medium such as a card from a gap between the pair of rib portions 1641 arranged on the guide unit 1064. That is, the guide unit 1064 has not only a role as a marker (a target of a card insertion portion) in terms of the outer appearance when the user inserts a sheet medium such as a card into an opening of the discharge portion 1006, but also a role of guiding an insertion direction of the sheet medium to restrict a movement of the sheet medium in a direction perpendicular to its insertion direction (a widthwise direction of the sheet medium). Therefore, by arranging the guide unit 1064 at an entrance of the conveying path where a sheet medium such as a card is to be inserted, the guide unit 1064 defines an insertion position of the sheet medium such as a card, and the sheet medium such as a card can be linearly inserted without being skewed and can be taken into the image reading apparatus 1010. Note that in this embodiment, the guide unit 1064 has a color different from its surrounding members (for example, the discharge portion 1006 and its neighboring members), and is easily visually confirmed (discriminated) as a card insertion port in terms of the outer appearance. A size of the guide unit 1064 between the pair of rib portions 1641 is decided in correspondence with an width of a standard size of, for example, a credit card.

Figure 13:
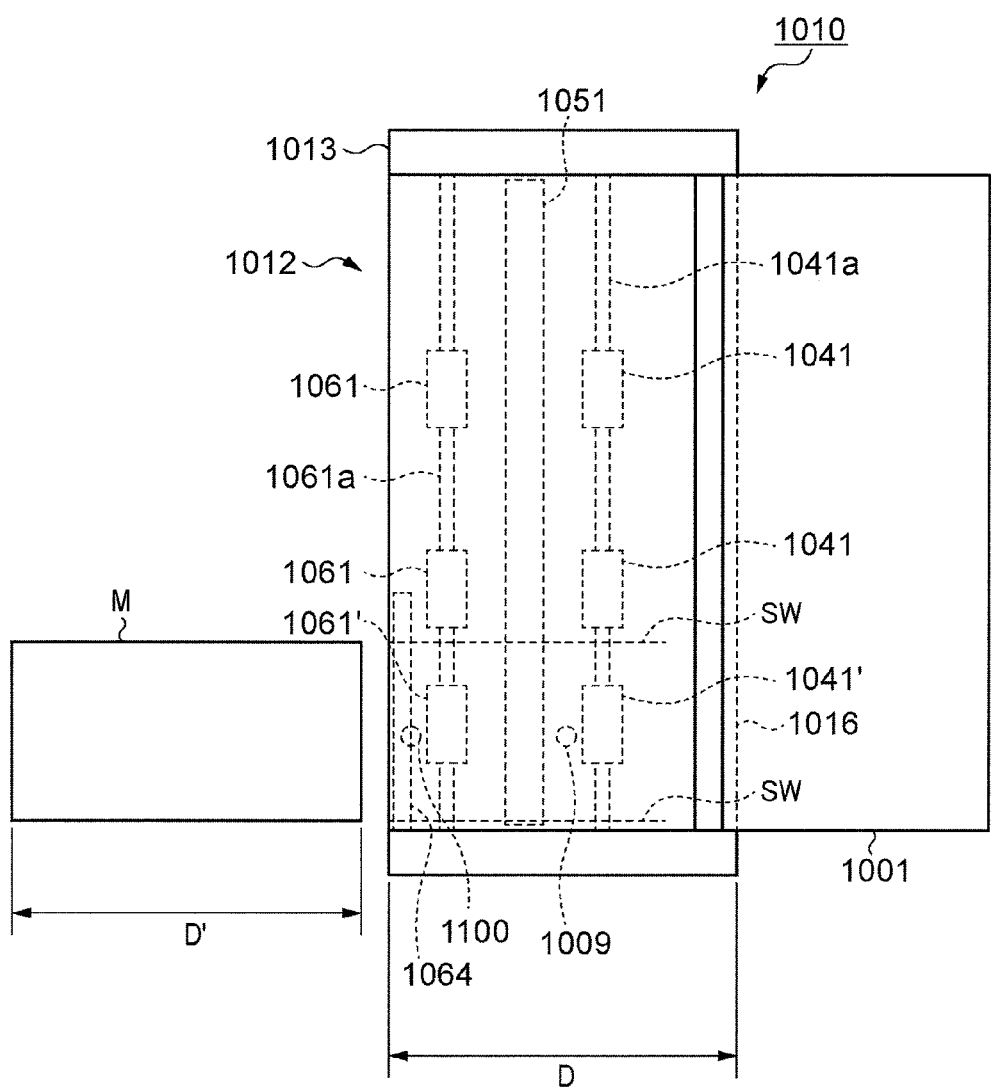
FIG. 13 is a planar perspective view illustrating the image reading apparatus.

As shown in FIG. 13, in the image reading apparatus 1010, an opening 1016 is formed in a rear portion of a conveying/reading portion 1013. At the time of reading of an image on a sheet medium M, the image reading apparatus 1010 linearly conveys the sheet medium M, and temporarily projects it from the opening 1016. This contributes to downsizing of the image reading apparatus 1010. For example, in this embodiment, a length D in a depth direction of the image reading apparatus 1010 is roughly equal to a length D' in a lengthwise direction of the sheet medium M. A conveying path SW of the sheet medium M includes a straight path which is formed to extend from the discharge port 1012 through a portion of the conveying path SW of the sheet medium M, and to communicate with the saving portion (a conveying path dedicated to the sheet medium M, and a saving area for switchback conveyance in this embodiment) 1032 open to the bent portion 1031. In this embodiment, for example, this saving portion 1032 is open, as the opening 1016, to the rear portion (rear surface) of the image reading apparatus 1010. Note that a conveying method of the sheet medium M will be described in detail in a second conveying method (to be described later).

The image reading apparatus 1010 can convey a document and read an image by two different conveying methods to be described below.

<First Conveying Method>

The operation of the image reading apparatus 1010 in a first conveying method will be described below with reference to FIG. 15.

In the first conveying method, a document (sheet medium S) is fed from the tray 1001, and is discharged outside the apparatus from the discharge portion 1006 via the conveying path 1003. In the first conveying method, the sheet medium S is conveyed by rotating a plurality of first conveying roller pairs 1041 and 1041' and a plurality of second conveying roller pairs 1061 and 1061' (see FIG. 13).

The user places a bundle of sheets as documents on the tray 1001. Then, a reading start instruction is accepted from the user via a reading controller (not shown). This reading controller is, for example, an operation unit arranged on the image reading apparatus 1010 or a computer connected to the image reading apparatus 1010 via a network.

Upon reception of the reading start instruction, the image reading apparatus 1010 starts conveyance of a document by the first conveying method. When the conveyance of the document is started, each sheet medium S placed on the tray 1001 is conveyed inside the apparatus in a first conveying direction in a normal rotation conveyance mode shown in FIG. 15. More specifically, a sheet medium, which is separated one by one from a bundle of sheets by the feed portion 1002, is conveyed to the first conveying roller pair 1041 via the bent portion 1031, and is then conveyed to the image reading portion 1005 by the first conveying roller pair 1041. In this case, the detection sensor 1009 detects an arrival timing of the leading end of the sheet medium S to the image reading portion 1005, thereby starting an image reading operation. Upon completion of the image reading operation, the leading end of the sheet medium S pushes up the rib portions 1641 of the guide unit 1064 via the second conveying roller pair 1061, which is rotated in a normal direction. The guide unit 1064, which includes rotary fulcrum portions 1642 on the upper portion of the conveying path 1003, is rotated when it is pushed by the sheet medium S, and is retracted from the conveying path 1003. Then, the sheet medium S is sequentially discharged outside the apparatus from the discharge portion 1006.

<Second Conveying Method>

Figure 16:
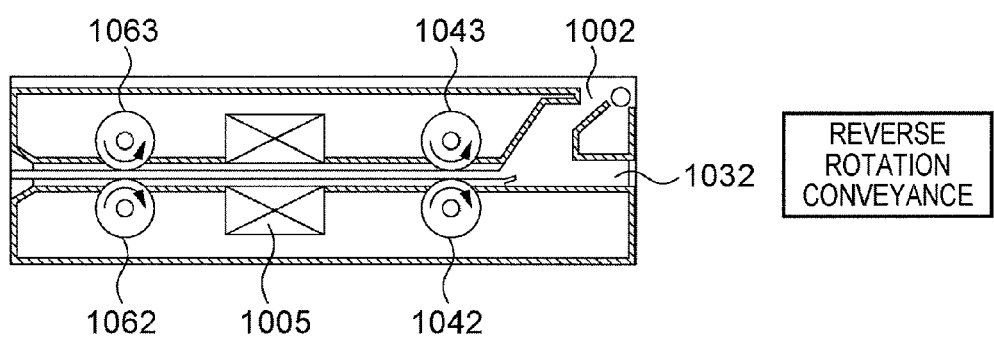
FIG. 16 is a side sectional view for explaining reverse rotation conveyance in the image reading apparatus.

The operation of the image reading apparatus 1010 in a second conveying method will be described below with reference to FIGS. 16 and 17.

In the second conveying method, a sheet medium M is fed from a gap between the two parallel ribs, which close the conveying path 1003, of the guide unit 1064 in the discharge portion 1006. At this time, even when the user obliquely inserts the sheet medium M, the sheet medium M is rotated to have the guide unit 1064 as a fulcrum, thus correcting any skew, as shown in FIG. 17. That is, the guide unit 1064 also serves as a correction (reclaim) portion required to regulate a movement in the widthwise direction of the sheet medium M and to prevent any skewed insertion. The sheet medium M, whose skewed insertion is corrected at the time of insertion of the sheet medium M, is conveyed toward the saving portion 1032 when the respective rollers are rotated in a reverse direction. After that, the sheet medium M is conveyed toward the discharge portion 1006 again when the respective rollers are rotated in a normal direction, and is discharged from the discharge portion 1006. Note that in the second conveying method, for example, a card having a relatively high rigidity is applicable as a document (sheet medium M). Note that the interior of the conveying path 1003 in the image reading apparatus 1010 is formed with recessed grooves (concave portions) in correspondence with the thickness of the sheet medium M, so as to commonly convey the sheet medium S and the sheet medium M which is thicker than the sheet medium S. For this reason, the sheet medium M whose skewed insertion is corrected is conveyed along the card conveying path SW (see FIG. 13) of the conveying path 1003 by the switchback conveyance without being skewed.

The following description will be given under the assumption that a card is used as the sheet medium M. Note that the present invention is not limited to this, and an arbitrary sheet medium may be selected as a document. In the second conveying method, the sheet medium M is conveyed by rotating only the second conveying roller pair 1041' and second conveying roller pair 1061' (see FIG. 13) unlike in the first conveying method. That is, only the required roller pairs are driven in correspondence with the width in the widthwise direction of the sheet medium M. However, the present invention is not limited to this, and a plurality of roller pairs may be used even in the second conveying method.

The user inserts a card into a card insertion port regulated by the rib portions 1641 of the guide unit 1064. Since the rib portions 1641 are disposed to have a gap larger than the card width by about 5 mm, as described above, they can specify an insertion position. When the image reading apparatus 1010 detects insertion of the card by the discharge sensor 1100, it starts conveyance of the document by the second conveying method. The card is conveyed inside the apparatus in a second conveying direction by rotating the respective rollers in a reverse direction in a reverse rotation conveyance mode shown in FIG. 16 to be fed to the image reading portion 1005. After that, an image on one face of the card is read, and the card is then fed to the first conveying roller pair 1041. The leading end of the card fed to the first conveying roller pair 1041 avoids the bent portion 1031, and is fed to the saving portion 1032. The saving portion 1032 is located on a line that couples the discharge portion 1006 and conveying portion 1004, as shown in FIG. 12, and is arranged to avoid the bent portion 1031 located between the feed portion 1002 and conveying portion 1004. By arranging the saving portion 1032, an apparatus conveying path can be prolonged, thus preventing an increase in size of the apparatus.

Figure 15:
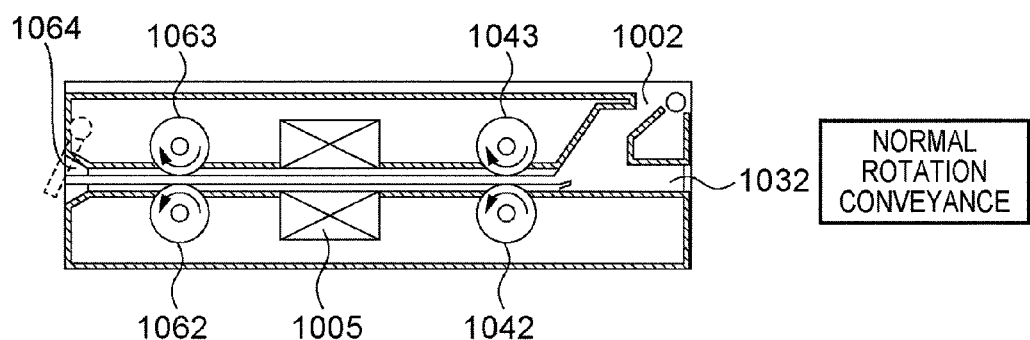
FIG. 15 is a side sectional view for explaining normal rotation conveyance in the image reading apparatus.

After that, when the detection sensor 1009 detects that the trailing end of the card has passed through the image reading portion 1005, the first and second conveying roller pairs 1041 and 1061 are rotated by the driving portion (not shown) in the normal direction, as shown in FIG. 15, thus changing the conveying direction of the card to normal direction, that is, to a direction of the discharge portion 1006. After that, the card is conveyed inside the apparatus in the first conveying direction, and when the card passes through the image reading portion 1005 again, an image on the other face is read. Then, the card is discharged outside the apparatus from the discharge portion 1006. Note that in this embodiment, one driving motor is used as the driving portion to drive the overall apparatus.

Figure 14:
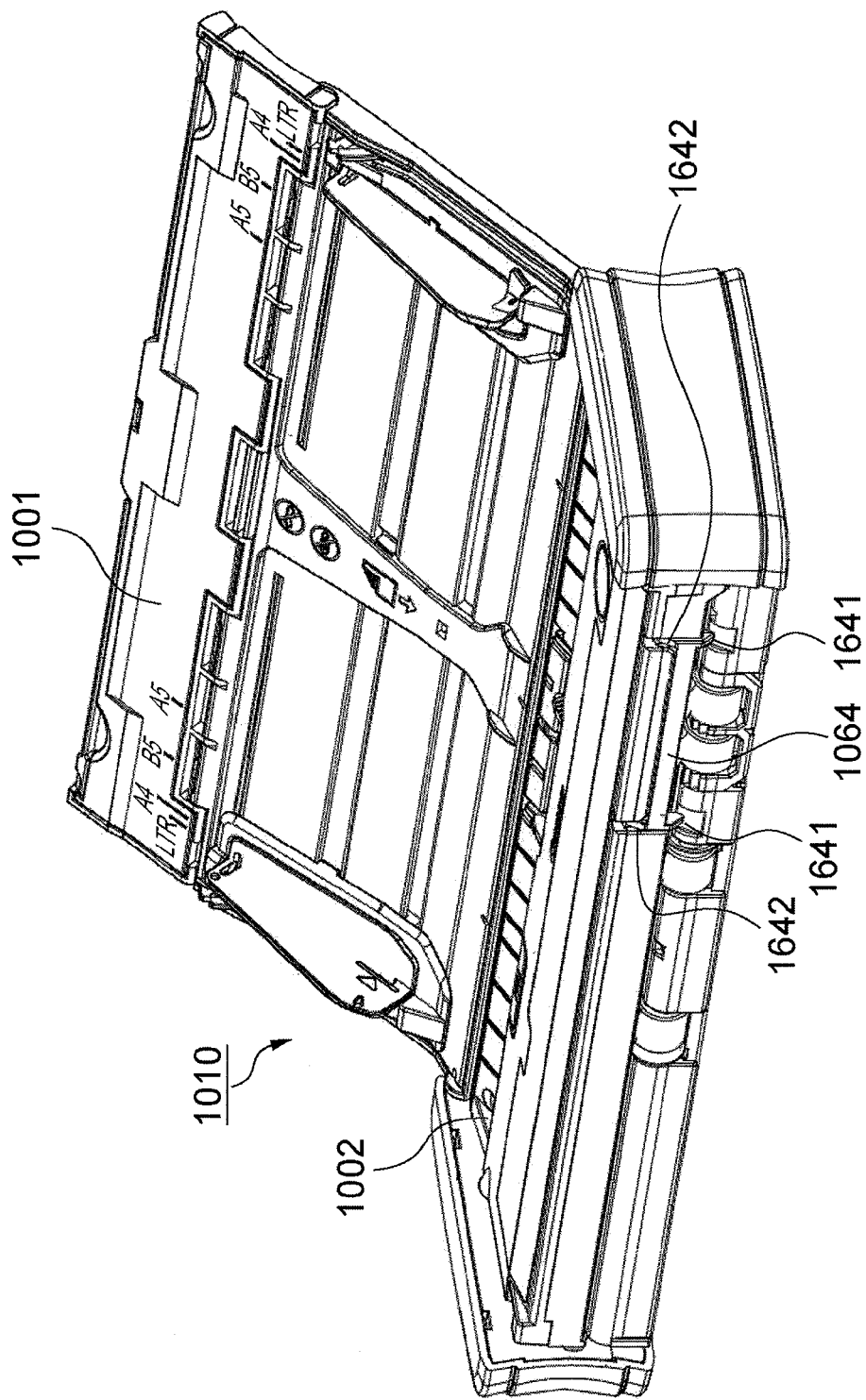
FIG. 14 is a perspective view of the image reading apparatus.

The second conveying method in the image reading apparatus 1010, which is downsized according to this embodiment, will be described in more detail below with reference to FIGS. 13, 14, and 17. In the image reading apparatus 1010, the discharge port 1012 includes a card feed port sectioned by the rib portions 1641 of the guide unit 1064, as shown in FIG. 14. Thus, a movement in the widthwise direction is substantially restricted. After that, card side portions of a card are guided by the right and left rib portions 1641 of the guide unit 1064, as shown in FIG. 17. Even when the card is obliquely inserted by mistake, the card side portions contact the guide unit 1064. Even when card conveyance in a forward path is started, the card is conveyed along the inner surfaces (rib portions 1641) of the guide unit 1064 from its leading end side to have the guide unit 1064 as the center (insertion reference), thus effectively preventing any skew (especially, skewed insertion) of the card.

In FIG. 13, in a state in which after the card is inserted into the card feed port, the leading end of the card reaches a rear end portion of the image reading apparatus 1010, the entire card is temporarily housed inside the image reading apparatus 1010. After that, when the trailing end portion of the card has passed the detection sensor 1009, the card goes into the saving portion 1032, and the respective rollers are rotated in the reverse direction. At this time, the leading end portion side of the card temporarily projects from the opening 1016. In this embodiment, the opening 1016 is formed in the rear surface side of the image reading apparatus 1010, and the end portion of the card temporarily projects from the opening 1016 at the time of switchback. For example, such opening 1016 may not formed, and a space that allows the switchback conveyance may be assured inside the apparatus. In some cases, the card may be directly discharged from the opening 1016 on the rear surface side of the image reading apparatus 1010 without executing the switchback conveyance.

Note that the image reading apparatus 1010 includes wall portions (conveying guides of the medium M) on at least portions corresponding to the discharge port 1012 side and its opposite side (opening 1016 side) of the conveying/reading portion 1013 in the card conveying path as regulation wall portions used to prevent any skew of the card, thus correcting skews in both forward and backward paths.

In this way, the image reading apparatus 1010 of this embodiment attains switchback conveyance (second conveying method) of the sheet medium M (card) by commonly using a portion of the conveying path, while attaining conveyance (first conveying method) of the sheet medium S shown in FIG. 12. Hence, any skew of the sheet medium M can be effectively prevented, and image reading quality can be improved. Also, conveyance errors such as jams upon conveyance of the sheet medium M can be prevented, thus efficiently reading an image on the sheet medium M.

This embodiment has exemplified the case in which the guide unit 1064 cannot be detached from the image reading apparatus 1010. For example, the guide unit 1064 is detachably configured by dropping the rotary fulcrums 1642 of the guide unit 1064 into U-shaped grooves, and the same effects can also be obtained. Operations and the like are the same as the above embodiment, and a description thereof will not be repeated.

This embodiment has exemplified the image reading apparatus 1010. However, the present invention is applicable to a media conveying apparatus for a sheet, card, and the like, which includes a predetermined processing unit such as an image forming unit in place of the image reading units 1051 and 1052.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-246736, filed Nov. 2, 2010, and No. 2011-189262, filed Aug. 31, 2011, which are hereby incorporated by reference herein in their entirety.

What is claimed is:

1. An image reading apparatus comprising:
an introduction port used to introduce a first medium;
a discharge port used to discharge the first medium;
an image reading unit configured to read an image on the first medium, said image reading unit being arranged on a conveying path of the first medium, which extends from said introduction port to said discharge port;
a conveying unit configured to convey the first medium from said introduction port to said discharge port, and to convey a second medium, a width of which is smaller than the first medium and which is introduced from said discharge port, to said image reading unit, so as to read an image on the second medium by said image reading unit; and
guide portions configured to guide the second medium introduced from said discharge port along the conveying path, said guide portions being arranged along a conveying direction of the second medium to oppose side surface portions in a widthwise direction of the second medium,
wherein said guide portions are formed by inner side surfaces of a concave portion formed in a portion which forms a conveying path of the second medium.

2. The apparatus according to claim 1, wherein an end portion on the discharge port side of the concave portion form an introduction port of the second medium.

3. The apparatus according to claim 1, wherein a portion of the discharge port is commonly used as an introduction port of the second medium, and a discharge port of the second medium after an image is read by said image reading unit.

4. The apparatus according to claim 1, wherein said guide portions are respectively arranged on at least portions corresponding to the discharge port side and an opposite side thereof of said image reading unit in a conveying path of the second medium.

5. The apparatus according to claim 1, wherein said image reading unit is arranged to be movable in a direction to be separated away from the conveying path in accordance with a thickness of the second medium.

6. The apparatus according to claim 1, wherein said conveying unit includes a first conveying mode for conveying a medium from said introduction port toward said discharge port, and a second conveying mode for conveying a medium from said discharge port toward said image reading unit, and
said conveying unit conveys the second medium in the second conveying mode in response to introduction of the second medium into said discharge port, and switches the conveying mode to the first conveying mode after the second medium has passed a region opposing said image reading unit.

7. An image reading apparatus comprising:
an introduction port used to introduce a first medium;
a discharge port used to discharge the first medium;
an image reading unit configured to read an image on the first medium, said image reading unit being arranged on a conveying path of the first medium, which extends from said introduction port to said discharge port;
a conveying unit configured to convey the first medium from said introduction port to said discharge port, and to convey a second medium, a width of which is smaller than the first medium and which is introduced from said discharge port, to said image reading unit, so as to read an image on the second medium by said image reading unit; and
guide portions configured to guide the second medium introduced from said discharge port along the conveying path, said guide portions being arranged along a conveying direction of the second medium to oppose side surface portions in a widthwise direction of the second medium,
wherein the conveying path of the first medium includes a bent portion, which is bent on an upstream side of said image reading unit.

8. The apparatus according to claim 7, wherein a conveying path of the second medium comprises a straight path which is formed to extend from said discharge port through the conveying path of the first medium to a slit open to the bent portion.

9. The apparatus according to claim 7, wherein a portion of the discharge port is commonly used as an introduction port of the second medium, and a discharge port of the second medium after an image is read by said image reading unit.

10. The apparatus according to claim 7, wherein said guide portions are respectively arranged on at least portions corresponding to the discharge port side and an opposite side thereof of said image reading unit in a conveying path of the second medium.

11. The apparatus according to claim 7, wherein said image reading unit is arranged to be movable in a direction to be separated away from the conveying path in accordance with a thickness of the second medium.

12. The apparatus according to claim 7, wherein said conveying unit includes a first conveying mode for conveying a medium from said introduction port toward said discharge port, and a second conveying mode for conveying a medium from said discharge port toward said image reading unit, and
said conveying unit conveys the second medium in the second conveying mode in response to introduction of the second medium into said discharge port, and switches the conveying mode to the first conveying mode after the second medium has passed a region opposing said image reading unit.

13. An image reading apparatus comprising:
an introduction port used to introduce a first medium;
a discharge port used to discharge the first medium;
an image reading unit configured to read an image on the first medium, said image reading unit being arranged on a conveying path of the first medium, which extends from said introduction port to said discharge port;
a conveying unit configured to convey the first medium from said introduction port to said discharge port, and to convey a second medium, a width of which is smaller than the first medium and which is introduced from said discharge port, to said image reading unit, so as to read an image on the second medium by said image reading unit;
guide portions configured to guide the second medium introduced from said discharge port along the conveying path, said guide portions being arranged along a conveying direction of the second medium to oppose side surface portions in a widthwise direction of the second medium; and
a guide member including said guide portions,
wherein said guide member is arranged to be displaceable between a guide position at which said guide portions guide the second medium, which is introduced from said discharge port into the conveying path, and a retraced position at which said guide member does not disturb conveyance of the first medium which passes through the conveying path.

14. The apparatus according to claim 13, wherein said image reading unit is arranged to be displaceable between a first position for reading the first medium and a second position for reading the second medium, and said apparatus further comprises an interlocking mechanism which displaces said image reading unit to be interlocked with a displacement of said guide member, so as to locate said image reading unit at the first position when said guide member is located at the retracted position, and to locate said image reading unit at the second position when said guide member is located at the guide position.

15. The apparatus according to claim 13, wherein said guide member is arranged to be swingable about an axis parallel to a direction perpendicular to the conveying direction of the first medium between the guide position and retracted position.

16. An image reading apparatus comprising:

an image reading unit configured to read an image formed on a sheet-like medium conveyed along a conveying path;

a first conveying unit configured to convey a first medium to said image reading unit by a first conveying method along the conveying path;

a second conveying unit configured to convey a second medium to said image reading unit by a second conveying method along the conveying path; and a guide unit configured to serve as a guide required to feed the second medium to said second conveying unit, wherein a second medium feed portion used to feed the second medium to said second conveying unit is commonly used as a discharge portion used to discharge the first medium conveyed by said first conveying unit to outside said apparatus, and a discharge portion used to discharge the second medium conveyed by said second conveying unit to outside said apparatus, and said guide unit is arranged in the discharge portion to be swingable in a first conveying direction.

17. The apparatus according to claim 16, wherein said guide unit restricts a movement in a widthwise direction perpendicular to an insertion direction of the second medium.

18. The apparatus according to claim 16, wherein said guide unit includes rib portions which restrict a movement in the widthwise direction of the second medium when the second medium is fed from the discharge portion, and said guide unit is arranged to be detachable from said apparatus.

19. An image reading apparatus comprising:

an image reading unit configured to read an image formed on a sheet-like medium conveyed along a conveying path;

a first conveying unit configured to convey a first medium to said image reading unit by a first conveying method along the conveying path;

a second conveying unit configured to convey a second medium to said image reading unit by a second conveying method along the conveying path; and a guide unit configured to serve as a guide required to feed the second medium to said second conveying unit, wherein said first conveying unit includes a first medium feed portion used to feed the first medium, and a bent portion used to bend the first medium fed from the first medium feed portion and to feed the bent first medium to the conveying path, and said second conveying unit includes a saving portion which is located on the conveying path to avoid the bent portion, and is used to save the second medium from the conveying path.

20. The apparatus according to claim 19, wherein said first conveying unit conveys the first medium toward the discharge portion along the conveying path in a first conveying direction via said image reading unit, and said second conveying unit conveys the second medium toward the saving portion along the conveying path in a second conveying direction via said image reading unit, and then conveys the second medium from the saving portion toward the discharge portion along the conveying path in the first conveying direction.

\* \* \* \* \*